United States Patent [19]

Dye

[11] Patent Number: 5,625,768
[45] Date of Patent: Apr. 29, 1997

[54] METHOD AND APPARATUS FOR CORRECTING ERRORS IN PIXEL CHARACTERISTICS WHEN INTERPOLATING POLYGONS INTO A PIXEL GRID

[75] Inventor: Thomas A. Dye, Austin, Tex.

[73] Assignee: Cirrus Logic, Inc., Fremont, Calif.

[21] Appl. No.: 299,739

[22] Filed: Sep. 1, 1994

Related U.S. Application Data

[63] Continuation-in-part of Ser. No. 247,657, May 23, 1994.
[51] Int. Cl.$^6$ .................................................. G06T 5/00
[52] U.S. Cl. ...................... 395/141; 395/126; 395/133; 382/266; 382/267; 382/269
[58] Field of Search ........................ 395/141, 133, 395/142, 143, 150, 151, 119, 120, 126–132; 382/266–275

[56] References Cited

U.S. PATENT DOCUMENTS 5,420,972  5/1995  Johnson, Jr. et al. .................. 395/143

OTHER PUBLICATIONS

Foley, van Dam, Feiner, Hughes, Phillips, *Introduction to Computer Graphics*, Chapter 3, pp. 65–128 (1990).

*Primary Examiner*—Almis R. Jankus
*Attorney, Agent, or Firm*—Stanford & Bennett

[57] ABSTRACT

An incremental orthogonal error correction process for 3D graphics for correcting errors or otherwise reducing abrupt changes in the characteristics of adjacent pixels while interpolating a polygon into a pixel grid. Error values are calculated for each desired characteristic to be corrected, where the error values are calculated based on the slope of the main slope and the orthogonal slope of the corresponding characteristic value. Thus, the error values adjust the characteristics of the pixels in the scan line to adjust for the slant of the main slope of the polygon. An interpolator for each corrected characteristic accumulates the error value in the opposite direction as the corresponding orthogonal slope. When the fractional component of the x parameter overflows, the orthogonal slope values are subtracted from the corresponding accumulated error values to thereby reduce the magnitude of the error values. Thus, the error values accumulate until an overflow causes a pixel shift of the scan line, and then the magnitude of the errors is reduced. The resulting values of the characteristics along the surface of the polygon appear smoother and monotonic. Furthermore, intersection lines between polygons drawn in 3D space appear straight rather than jagged.

44 Claims, 11 Drawing Sheets

METHOD AND APPARATUS FOR CORRECTING ERRORS IN PIXEL CHARACTERISTICS WHEN INTERPOLATING POLYGONS INTO A PIXEL GRID

CROSS-REFERENCES TO RELATED APPLICATION

This is a continuation-in-part of application Ser. No. 08/247,657 filed on May 23, 1994 entitled "Dynamic Pipeline for a Processor."

FIELD OF THE INVENTION

The present invention relates to three-dimensional graphics, and more particularly to a method and apparatus for minimizing orthogonal errors while interpolating polygons into a pixel grid.

DESCRIPTION OF THE RELATED ART

The advent of substantial hardware improvements combined with standardized graphics languages has allowed the use of complex graphics functions in even the most common applications. For example, word processors, spread sheets and desktop publishing packages are now beginning to take full advantage of the improvements in graphics capabilities to improve the user interface. Although sophisticated graphics packages have been available for computer aided drafting, design and simulation for some time, three-dimensional (3D) displays are now common in games, animation, multimedia communication and drawing packages designed for personal computers.

It is evident that the demand for greater graphic capabilities has increased dramatically. Thus, graphic systems must be capable of performing more sophisticated functions in less amount of time in order to process greater amounts of graphical data required by modern software applications. There is a continuing need for improvements in software algorithms and hardware implementations to draw three-dimensional objects using full color, shading, texture mapping, and transparency blending.

The development of raster display systems dramatically reduced the overall cost and increased the capabilities of graphic systems. In a raster display system, a set of horizontal or orthogonal scan lines, each comprising a row of pixels, forms an array or grid of pixels to represent the entire screen area. The screen is preferably a cathode ray tube or LCD display or the like capable of scanning the entire pixel grid at a relatively high rate to reduce flicker as much as possible. The pixel data is preferably stored in a frame buffer comprising dynamic random access memories (DRAMs), or more preferably video RAMs (VRAMs), where each pixel is represented by one or more bits depending upon the desired resolution. Typical display systems can draw screens with multiple colors at a variety of screen resolutions, such as 640×480, 800×600, 1024×768, 1280×1024 or more pixels depending upon the software drivers and the hardware used.

A video controller scans and converts the pixel data in the frame buffer to the control signals required by the screen system to display the information on the screen. In particular, the video controller scans each of the pixels sequentially, preferably from top to bottom and from left to right, and converts pixel data into intensity values for corresponding pixels on the screen. In a color graphics system using a CRT, three separate beams are controlled for each of the primary colors, where the intensity of each of the beams is determined by the pixel value corresponding to the respective colors. A similar system is used for LCD displays. In the preferred embodiment, each pixel value comprises 24 bits, one byte for each of the primary colors red, green, and blue, where the byte number determines the intensity of the respective color.

Other improvements have been made in the hardware realm, including graphics processors and accelerators with corresponding software drivers where the drivers interface between the host central processing unit (CPU) and the graphics processor. In general, the software driver receives information for drawing objects on the screen, calculates certain basic parameters associated with the objects and provides these to the graphics processor. The software driver then sends a command for the graphics processor to draw the object into the frame buffer. A graphics processor may use interpolation techniques where the fundamental information for the object to be drawn comprises a series of initial and incremental parameters or values. The graphics processor loads or otherwise receives the initial parameters for a first pixel, and then interpolates the object by incrementing the parameters until the object is complete. The parameters include x, y values to identify or locate each pixel on the screen.

There has also been an advance in graphics software such as the development of graphics standards. In particular, 3D core graphics system (CORE) was produced by ACM SIG-Graph Committee in 1977. Subsequently, the graphics kernel system (GKS), similar to CORE, became the first standardized graphics specification. Other more sophisticated standards developed, such as programmer's hierarchical interactive graphics systems (PHIGS). PHIGS has been extended with a set of features for pseudo-realistic rendering of objects on raster displays, called PHIGS-plus. Another graphics package developed called SPHIGS (simple PHIGS), which is a subset of PHIGS that supports some of the simpler PHIGS-plus features.

In spite of the high resolutions and speed of raster graphics, several inherent problems exist when drawing primitive geometric shapes, such as lines, circles and arcs onto a raster display. In particular, diagonal lines appear jagged because of an undesirable effect known as aliasing, or otherwise known as "the jaggies" or staircasing. In fact, the diagonal or curved edges of most geometric objects produced on a raster display have a certain degree of staircasing since the raster display is digital in nature, where partial pixels cannot be drawn. Thus, each pixel is either drawn or not drawn for an object. Several solutions are available to at least reduce the amount of aliasing or staircasing on the display. One solution is to increase the resolution of the display so that more pixels are available to draw each of the graphics primitives. However, this increases the cost and complexity of the hardware. In particular, increased resolution requires a greater amount of memory to store the graphic image as well as a faster video controller to convey the graphic data to the screen. An increase in hardware complexity not only adds to the cost but also consumes valuable space and power, which is often prohibitive in portable or laptop computers.

Drawing techniques have also been used to reduce aliasing, such as anti-aliasing and various scan conversion and rasterization techniques. For example, unweighted area sampling is an anti-aliasing technique used for drawing lines, where each line is considered to have a certain width thereby forming a rectangle and each pixel is shaded using various shades of grey or different intensities of color corresponding to the area of the pixel that the rectangle covers. Scan conversion techniques have also been applied to circles, rectangles, text strings, as well as other geometric objects. One particular algorithm was developed by Bresenham, which is advantageous since it uses only integer arithmetic, thereby avoiding complicated arithmetic functions. Bresenham's incremental technique may be applied to the integer computation of circles as well as other geometric shapes. Interpolated shading techniques have also been developed where shading information is computed for each polygon vertex and interpolated across the polygon to determine the shading at each pixel. One particular technique is known as Gouraud shading.

In spite of the existing improvements and developments, one particular problem area is drawing multiple-sided, coplanar polygons with shading along their surfaces. To achieve shading along the surface of the polygon in both the orthogonal and vertical directions, an initial color intensity value is provided and incremental intensity values are supplied for both directions. Since the object is usually interpolated while being drawn on a raster display, however, a certain amount of error exists between the characteristics of the theoretical object being drawn and the rasterized realization of the object into pixels. When the polygon is drawn beginning along an initial side that is not purely horizontal, vertical or diagonal, the conversion of the interpolated data into a rasterized or pixel grid display results in an accumulation of error from one orthogonal scan line to the next. This occurs because the memory of the display is limited and because all objects must be mapped to the pixel grid comprising pixels with defined boundaries, so that each pixel covers a small area of the object rather than a single point. Slight variations of the area covered from one scan line to the next causes an unrepresented accumulation of error. Consequently, when the initial side of the polygon crosses a column boundary so that the next orthogonal scan line jumps or begins one column over while drawing the polygon, the accumulation of error causes a large variation in characteristic values between vertically adjacent pixels. This is especially true if the intensity or color gradient along the orthogonal axis is relatively large, resulting in a banding effect where the shading appears non-monotonic. The banding effect occurs with color intensity, for example, because darker pixels are aligned next to lighter pixels on adjacent scan lines.

A similar banding effect problem arises when alpha-blending for transparency and when applying texture mapping to surfaces of polygons. In general, alpha blending is achieved by blending or combining the pixel values of an object in the foreground with the pixel values of an object in the background so that the foreground object appears transparent. Although less obvious, errors in the alpha values cause the transparency gradient to appear non-monotonic across the surfaces of the polygon. Likewise, errors in texture mapping cause similar irregularities, especially at the object edges.

These problems are exacerbated in a 3D display, especially when em object in one plane intersects an object of another, where both objects have a common intersection line. Although the depth value is actually a third coordinate, similar to x,y values for the orthogonal and vertical coordinates, respectively, the depth value will be considered throughout this disclosure as a pixel characteristic rather than a coordinate since all objects are mapped to a 2D pixel grid. The depth value or characteristic is only used to determine whether a pixel is in front of or behind a corresponding pixel of another object, which determines whether the pixel is drawn or not. Otherwise, the depth values have no visual effect on the pixels. Of course, the alpha values modify this somewhat in that a certain percentage of background and foreground pixels are blended for transparency effect. The buildup of error in the depth values along an intersection line between two objects in 3D space causes the line to appear jagged rather than straight. The eye is particularly sensitive to these irregularities, resulting in a less-pleasing display.

Such polygon drawing or interpolation errors have heretofore been ignored or tolerated. It is therefore desirable to provide a way to correct or minimize errors in the characteristics of the pixels that occur or otherwise accumulate while interpolating polygons onto a pixel grid array.

SUMMARY OF THE INVENTION

In an incremental orthogonal error correction process for 3D graphics according to the present invention, an error value is calculated for one or more pixel characteristics, where each error value is based on the orthogonal slope or incremental change of the characteristic in the orthogonal direction along one side of the polygon. The error value is accumulated in the opposite sense or direction as the orthogonal slope, and then is added to the initial pixel of each orthogonal span line. When the fractional portion of the x parameter overflows causing the next orthogonal scan line to begin one column over, the orthogonal slope value is added to reduce the magnitude of the accumulated error. In effect, the error value shifts the characteristics of adjacent orthogonal scan lines an appropriate amount to avoid a large and incongruous shift of the characteristics when the orthogonal scan line shifts by one pixel. In this manner, the variations of the corrected characteristics between adjacent orthogonal scan lines are more consistent, so that color shading appears monotonic along the surface of the polygon. When applied to depth, the intersection line between two intersecting objects appears straight rather than jagged or crooked. In the preferred embodiment, error correction is performed for both the intensity and the depth values, although an error correction procedure according to the present invention is easily extended to correct the alpha and texture-mapping values to achieve monotonic transparency and monotonic object edges.

The present invention may be incorporated to remove anomalies when filling any graphic object. In the preferred embodiment, however, the present invention is used for filling multiple-sided, randomly oriented, coplanar polygon surfaces in three dimensions, where the polygons have intensity shading, depth and alpha-blending. A software driver receives vertex information for drawing a polygon and calculates a set of fundamental parameters comprising initial and incremental values for each desired characteristic of the object. The parameters include initial x,y coordinates of a base point and an initial width of the polygon corresponding to the base point, and initial values for each of the desired characteristics, including intensity, alpha, and depth values for the base point. Furthermore, the parameters include slope or incremental values for each of the x, y, width, intensity, depth and alpha parameters used for interpolation. These parameters, along with a corresponding command, are then provided to a register file within a graphics processor implemented according to the present invention. The graphics processor loads the parameters into an interpolator and draws the polygon according to the command and the parameters.

All of the parameters preferably include integer and fractional portions for accuracy. However, due to the preferred use of video random access memories (VRAMs) to form the pixel grid and to achieve the desired speed, the incremental y parameter is preferably unity when interpolating polygons into a pixel grid. The incremental x value is the change of the x value corresponding to the unity increment of the y value along a primary edge or main slope, which spans the entire vertical dimension of the polygon. Also, the parameters include a count value representing the number of orthogonal scan lines used to draw the polygon.

For purposes of the present invention, the parameters calculated by the software driver include incremental error values for each characteristic to be corrected. In the preferred embodiment, the intensity and depth characteristics are corrected although the same principle could be applied to other characteristics, such as transparency and texture mapping in the same manner. A depth error value generally represents an adjustment of the depth along an orthogonal scan line to account for a shift of the main slope in the orthogonal direction. Likewise, an intensity error value represents an adjustment of the intensity along an orthogonal scan line to account for the shift of the main slope. The error values are incorporated to adjust initial pixels along the main slope while the polygon is being interpolated, which correspondingly adjusts the entire orthogonal span line.

The graphics processor according to the present invention first loads the parameters into an interpolator, which provides the initial coordinates, width and characteristic values. Then, the processor draws consecutive pixels along the orthogonal span line for the entire initial width, where the incremental orthogonal intensity, depth and alpha blending values are added or subtracted for each adjacent pixel. Next, the y coordinate is incremented to the next orthogonal span line, the count value is decremented, the x coordinate is modified by an incremental amount along the main slope, the width is modified by the incremental width value, and each of the initial characteristic values of the base point are modified by corresponding incremental vertical characteristic values by the graphics processor. Also, the error values are either added or subtracted to adjust the depth and intensity characteristics to correspond to any change of the main slope. This identifies and determines the characteristics of the next initial pixel along the main slope for the next orthogonal span line. Again, the processor draws consecutive pixels along the new orthogonal span line for the entire adjusted width in a similar manner described above, where orthogonal intensity, depth and alpha blending values are added or subtracted for each adjacent pixel.

The addition of the error value causes an accumulating adjustment in the opposite direction as the orthogonal slope value of the characteristic. This adjustment continues causing an accumulation of the error value for each corrected characteristic until an overflow of the fractional portion of the x parameter along the main slope causes a corresponding shift of the next orthogonal scan line by one pixel. Since each error value is based on the orthogonal slope of the characteristic and the fractional portion of the x parameter, the orthogonal slope is subtracted out to reduce the magnitude of the accumulated error. In this manner, adjacent scan lines are corrected so that the shading and depth characteristics along the surface of the polygon appear monotonic. The procedure is repeated for the entire polygon.

It is noted that the orthogonal scan lines are drawn from the main slope towards the body of the polygon, so that the scan lines may be drawn in either direction. Also, the values of the characteristics may either decrease or increase depending upon the desired characteristics of the object being drawn. In order to keep the signs of the operation correct, the error values are negated if their signs are the same as that of the orthogonal slopes or incremental values, so that the error values accumulate opposite that of the corresponding orthogonal slope values. Furthermore, in the preferred embodiment, up to two slopes opposite to the main slope may be defined for each polygon. An initial width, incremental width and count value are defined for each opposite slope. Thus, the polygon may be divided and drawn in two parts, between the main and a first opposite slope and then between the main and a second opposite slope. In either event, the error correction process according to the present invention remains unaffected.

The incremental orthogonal error correction process according to the present invention achieves monotonic shading of coplanar polygons. Furthermore, the intersection line of coplanar polygons in 3D space appears straight rather than jagged. The errors in the display are correspondingly reduced, resulting in an improved image that is more pleasing to the eye.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
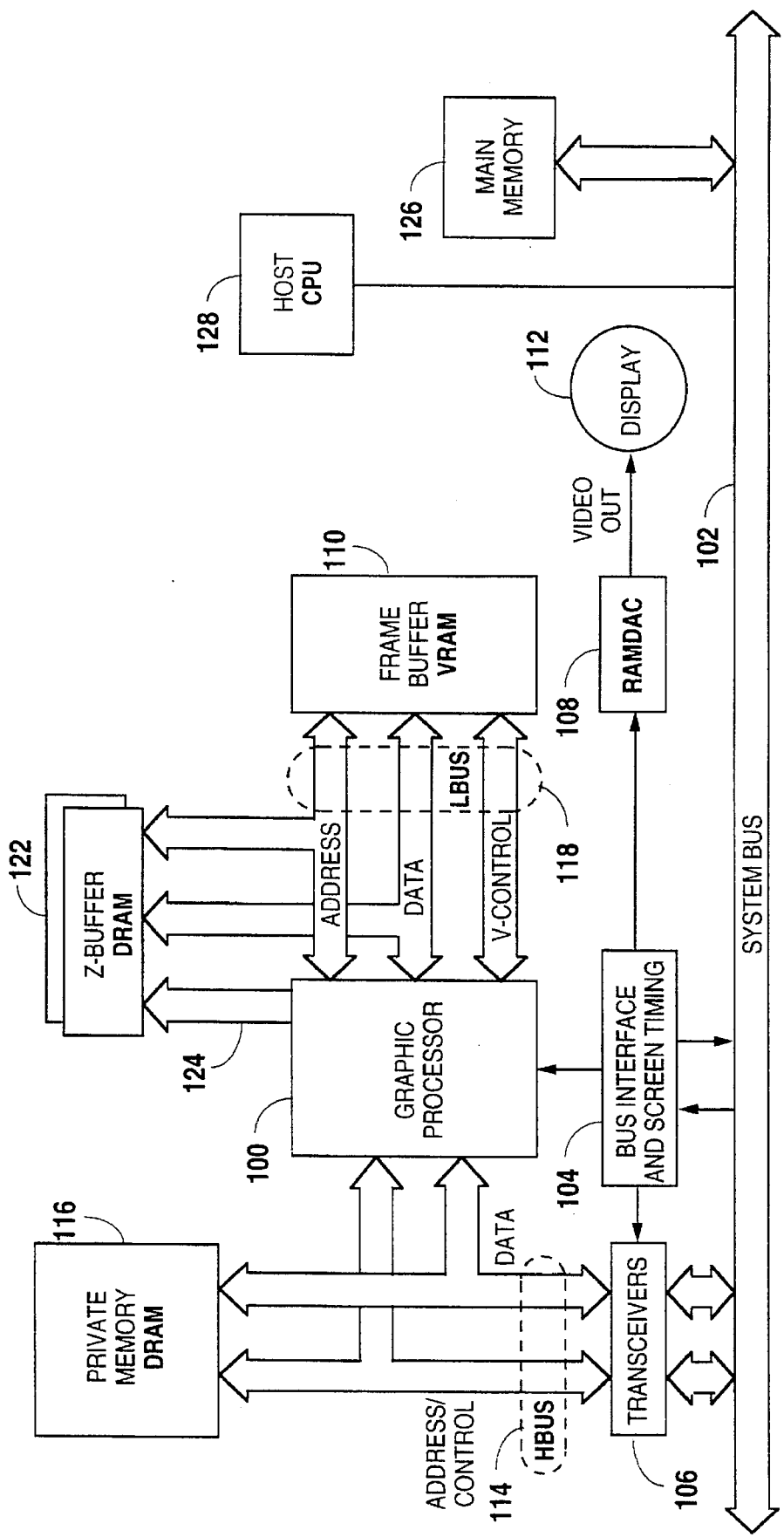
FIG. 1 is a simplified block diagram of a graphics system connected to a system bus of a computer system, where the graphics system includes a graphics processor according to the present invention.

Referring now to FIG. 1, a simplified block diagram is shown of a graphics system coupled to a system bus 102 of a host computer system, where the graphics system includes a graphics processor 100 implemented according to the present invention. The system bus 102 is any one of a plurality of different types of host or input/output (I/O) buses, including the industry standard architecture (ISA), the extended ISA (EISA), the peripheral component interconnect (PCI), the video electronic standard association (VESA) local bus or the L-bus, or any other standardized system bus of a computer system. The graphics processor 100 is preferably a 32-bit graphics processor operating at 33 MegaHertz (MHz) and is coupled to the system bus 102 through bus interface and screen timing logic 104. The bus interface and screen timing logic 104 is used to control a set of transceivers 106 and a random-access memory digital-to-analog converter (RAMDAC) 108, where it interfaces to the system bus 102, controls the decoding of cycles to the RAMDAC 108 and determines video timing.

The RAMDAC 108 receives digital data stored in a frame buffer 110 and converts the digital data to the appropriate analog outputs required by a display unit 112. In the preferred embodiment, the frame buffer 110 is part of a raster display implemented in a video RAM (VRAM), where the digital data comprises a rectangular array of picture elements referred to as pixels or pixel values. Each pixel is preferably 8 bits for defining the intensity of a single color of a corresponding pixel on a screen of the display unit 112. However, either three passes are made or three parallel logic slices are implemented for the three primary colors to achieve 24 bit pixel values for full color display. The display unit 112 may be any type, such as a cathode ray tube (CRT) for desktop, workstation or server applications, or a liquid crystal display (LCD) or the like commonly used for portable computers.

The transceivers 106 are used to interface the graphics processor 100 with the system bus 102 through address and data signals, collectively referred to as the HBUS 114, which is further connected to an optional private memory 116. In the preferred embodiment, the private memory 116 acts as a virtual frame buffer, display list storage, texture map, and bit mapped fonts storage memory to improve performance and functionality of the graphics system. The private memory 116 is preferably added as a separate bank of external dynamic RAMs (DRAMs) for providing a performance improvement by permitting faster access to display list instructions and pixel data compared to data stored in main memory 126 of the host computer system. The graphics processor 100 communicates to the frame buffer 110 through address data and control lines, collectively referred to as the LBUS 118, which is further connected to a Z-buffer 122, also preferably implemented using DRAMs. The Z-buffer 122 is preferably used to implement a depth buffer for three-dimensional (3D) graphic displays. Separate control signals 124 are also connected between the graphics processor 100 and the Z-buffer 122.

The host computer system preferably includes a central processing unit (CPU) 128 which is used to execute various software programs including a software driver which calculates and loads main and orthogonal slopes, start and stop values for pixel position, intensity, depth and transparency of objects to be rendered by the graphics processor 100. The software driver is preferably loaded into the main memory 126 from a permanent magnetic storage device, such as a hard drive or floppy drive device, and executed by the CPU 128, although other similar configurations are possible. The software driver will be described more fully below.

It is understood that the particular embodiment shown in FIG. 1 is only one of many possible implementations of a graphics system for use in a personal computer system. FIG. 1 is simplified for purposes of clarity so that many control signals are not shown. In the preferred embodiment, the graphics processor 100 provides hardware support for 2D and 3D graphics, text and windowing operations of a computer system. The graphics processor 100 transfers digital data between the main memory 126, the private memory 116, the frame buffer 110 and the Z-buffer 122, and processes the data for storage in the frame buffer 110 for ultimate display on the display device 112.

Figure 2:
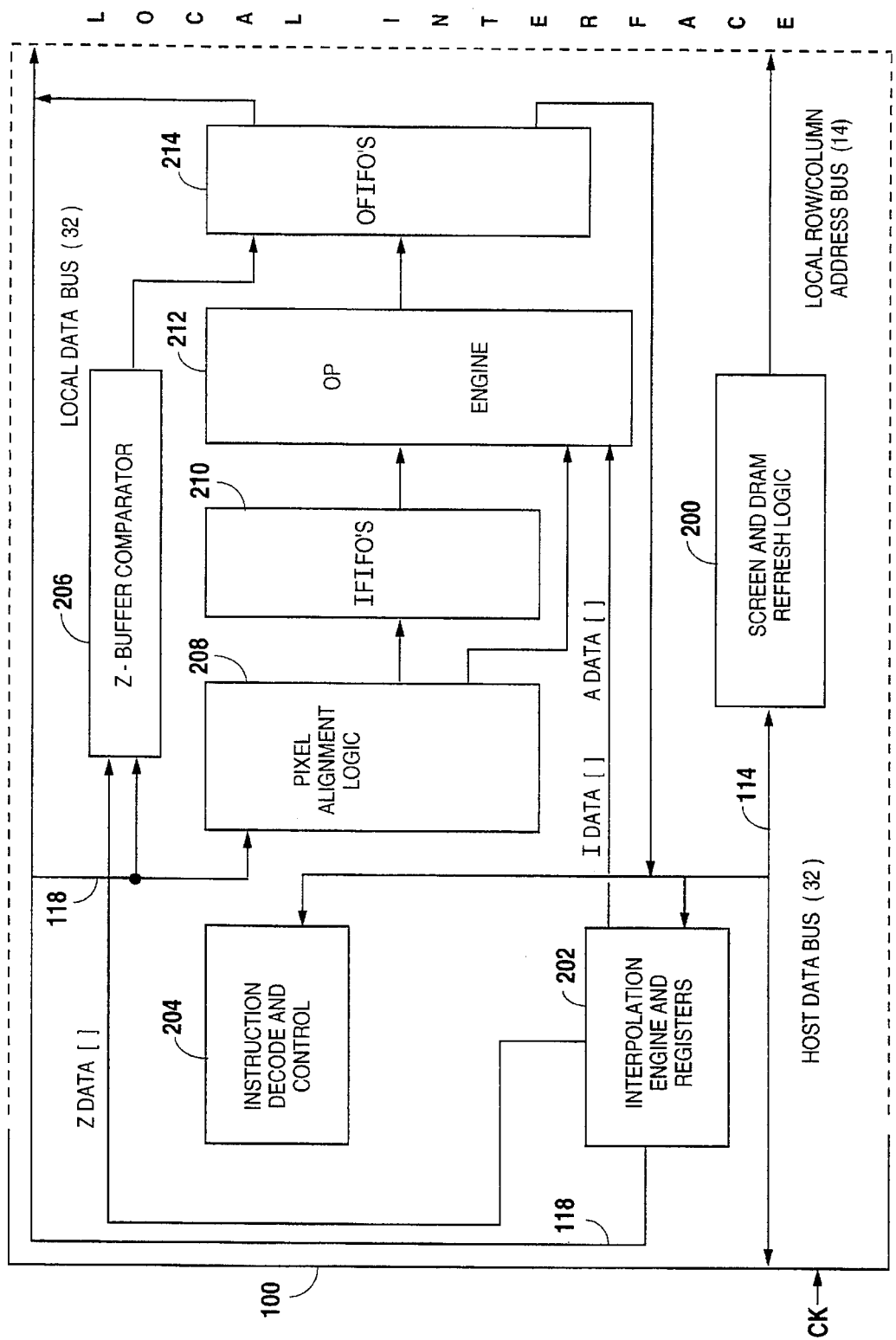
FIG. 2A is a simplified block diagram of the graphics processor of FIG. 1.

Referring now to FIG. 2, a simplified block diagram of the graphics processor 100 is shown. The HBUS 114 is connected to screen and refresh logic 200, an interpolation engine and associated registers (polyengine) 202, instruction decode and control logic 204, output first in, first out latches (OFIFOs) 214 and to pixel alignment logic 208. The HBUS 114 also preferably provides a 33 MHz clock signal CK, which synchronizes data flow and logic within the graphics processor 100. The screen and refresh logic 200 provides row and column address signals to the frame buffer 110 and to the Z-buffer 122. The pixel alignment logic 208 preferably includes registers and shift logic for the alignment of source and destination pixel addresses. The polyengine 202 preferably receives and stores vector data or parameters into a register file 500 (FIG. 5) for points, lines, polylines, polygons, and other geometric quantities, and then calculates or otherwise interpolates pixel position, color intensity, depth and transparency or alpha-blending for the various geometric quantities and characteristics. The register file 500 is preferably a set of 128 registers forming a read/write pre-storage and instruction queuing buffer for storing data and commands. The polyengine 202 determines address values for bit-block data transfer operations and provides color intensity values on an 8-bit bus having signals IDATA [7:0] and also provides alpha values on another 8-bit bus having signals ADATA[7:0] to an operation engine 212. The operation engine 212 generally performs alpha blending functions, color logic operations as well as compare and masking functions.

The LBUS 118 is provided to Z-buffer comparator logic 206 and also to pixel alignment logic 208. The Z-buffer comparator logic 206 is generally used for 3D operations for controlling the data to be displayed in overlap or transparency situations. Depth data values stored in the Z-buffer 122 are compared with depth values interpolated by the polyengine 202. As will be described more fully below, the polyengine 202 provides depth values on a 16-bit bus having signals ZDATA[15:0]. The pixel alignment logic 208 provides output pixel values to a set of input FIFOs (IFIFOs) 210 and also directly to the operation engine 212. These outputs are clocked through the IFIFOs 210 and output as pixel values which are provided to the operation engine 212. The IFIFOs 210 and the OFIFOs 214 are used to decouple the dynamic interface of the memories 110, 116, and 122. The IFIFOs 210 also synchronize source data for the opengine for read-modify-write (RMW) operations. The operation engine 212 provides output pixel values to the OFIFOs 214, which also provide pixel values from the Z-buffer comparator logic 206. The OFIFOs 214 provide pixel values from either the Z-buffer comparator logic 206 or from the operation engine 212, and provides these values to the LBUS 118 or to the HBUS 114.

In general, the graphics processor 100 operates in either a coprocessor or processor mode where the CPU 128 or the graphics processor 100, respectively, controls the system bus 102 for providing data and instructions to the register file 500 within the graphics processor 100 for execution. The polyengine 202 is designed to calculate pixel position, color intensity, depth and transparency or alpha-blending for the purpose of filling multiple-sided, coplanar randomly oriented polygon surfaces. Based upon the vertex points of the polygon to be rendered, the software driver calculates fundamental geometric parameters, including initial and incremental parameters for pixel position, count values, intensity, depth and transparency. These parameters and the corresponding instructions are then loaded into the register file 500, the polyengine 202 begins drawing orthogonal span lines in the frame buffer 110 to fill in the polygon. The interpolation process continues until the entire polygon has been filled in and drawn.

FIGS. 3A–3D illustrate several multi-sided polygons which can be drawn in a single command by the graphics processor 100 according to a preferred embodiment of the present invention. Such polygons include randomly oriented triangles, such as that shown in FIG. 3D, which do not have a "flat" bottom or a flat top. Although the graphics processor 100 can draw and shade many other types and shapes of polygons, such polygons may require more than one command. It is understood, however, that an error correction process according to the present invention may be applied to other graphic objects drawn in a pixel grid and is not limited to the particular implementation described herein.

Figure 3A:
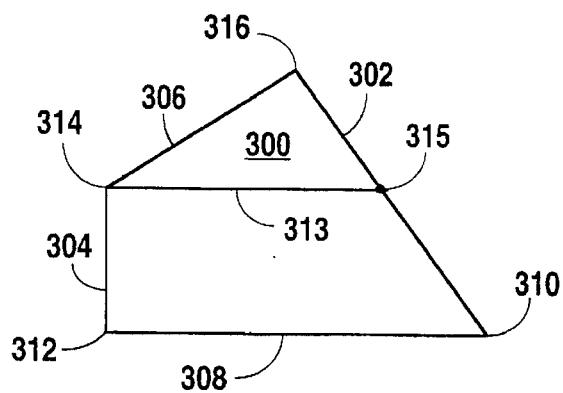
FIGS. 3A–3D are drawings of polygons which can be drawn and filled in a single command by the graphics processor of FIG. 1, according to the preferred embodiment.

To be able to draw any polygon with a single command in the preferred embodiment, certain constraints are followed. First, the polygon object preferably includes a single main slope, that is, one side that spans the entire vertical dimension of the polygon and that has no inflection points. In FIG. 3A, for example, a polygon 300 includes a main slope 302 spanning the entire vertical dimension of the polygon 300. The main slope 302 may have any orientation, but preferably has a vertical component in order to be non-trivial. Second, there are preferably no more than two opposite slopes per object. The opposite slopes can have any orientation as long as they lie completely on one side or the other of the main slope without crossing it and are within the vertical span of the main slope. In FIG. 3A, for example, the polygon 300 includes a first opposite slope 304 and a second opposite slope 306 relative to the main slope 302. Third, the polygon preferably includes up to three horizontal sides, including one at the bottom, one at the top, and one in-between the top and bottom where the opposite sides coincide in the vertical axis. A bottom side or base 308 of the polygon 300 shown in FIG. 3A has only a horizontal component and no vertical component and thus is considered a horizontal side rather than a slope. It is noted that three-sided polygons have no position or orientation restrictions whatsoever, so that any randomly oriented triangle is drawn with a single command. Fourth, the polygon is coplanar, meaning that the polygon lies in a single plane.

Figure 3B:
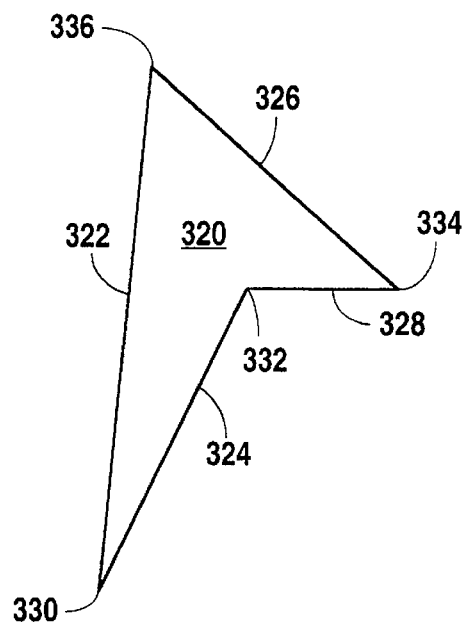
Figure 3C:
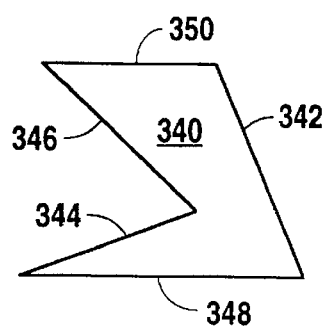
Figure 3D:
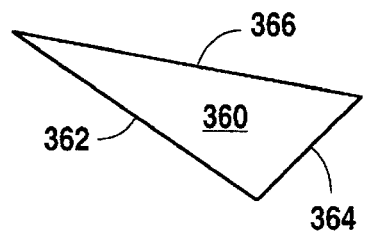

In FIG. 3B, a polygon 320 includes a main slope 322 extending the entire vertical extent of the polygon 320, a first opposite slope 324, a second opposite slope 326, and a horizontal side 328 intersecting the opposite slopes 324 and 326. In FIG. 3C, a five-sided polygon 340 is shown, including a main slope 342, two opposite slopes 344, 346 and two horizontal sides 348, 350 extending along the bottom and top, respectively, of the polygon 342. Also, a regular triangle 360 is shown in FIG. 3D, including a main slope 362 and two opposite slopes 364 and 366. Note that the polygons 300, 320, 340 and 360 may include depth values placing them in 3D space, but that polygons are mapped to a 2D grid for purposes of drawing them on the display 112. The depth values have no visual aspect other than for determining which objects or portion of objects are drawn since being in front of other objects. Furthermore, depth values identify intersecting points and lines of the polygon in 3D space.

FIGS. 3A–3D illustrate that the main slope is either on the right or left side of the polygon, as long as it expands the entire vertical dimension of the polygon. As will be described more fully below, the graphics processor 100 fills in or shades each polygon beginning at a base point at the lower vertice of the main slope and draws horizontal or orthogonal span lines, each beginning at the main slope and ending at an opposite slope. Although it is preferred that the polygons be drawn from bottom to top, the orthogonal span lines may also be drawn from top to bottom. In FIG. 3A, the polygon 300 includes a base point 310 at the bottom vertice of the main slope 302, where the first orthogonal span line is drawn right to left from the base point 310 along the horizontal side 308 to a vertice 312 at the bottom end of the opposite slope 304. The next orthogonal span line is the next pixel row above the horizontal side 308 and is drawn between corresponding points along the main slope 302 and the opposite slope 304. This process continues until an orthogonal line 313 is drawn to a midpoint 314 from a corresponding point 315 on the main slope 302. Then, orthogonal span lines are drawn from the main slope 302 to the opposite slope 306. The procedure is completed when the last orthogonal span line (or point) is drawn at the upper vertice of 314 of the main slope 302.

Likewise in FIG. 3B, the polygon 320 includes a base point 330 at the lower vertice of the main slope 322. The orthogonal span lines are drawn left to right from the main slope 322 towards the opposite slope 324 until reaching a mid-point 332, at which point the procedure continues where orthogonal span lines are drawn from the main slope 322 towards the opposite slope 326 from a midpoint 334 to an endpoint 336 at the intersection of the opposite slope 326 and the main slope 322. The procedure is very similar for the polygons 340 and 360.

Figure 4:
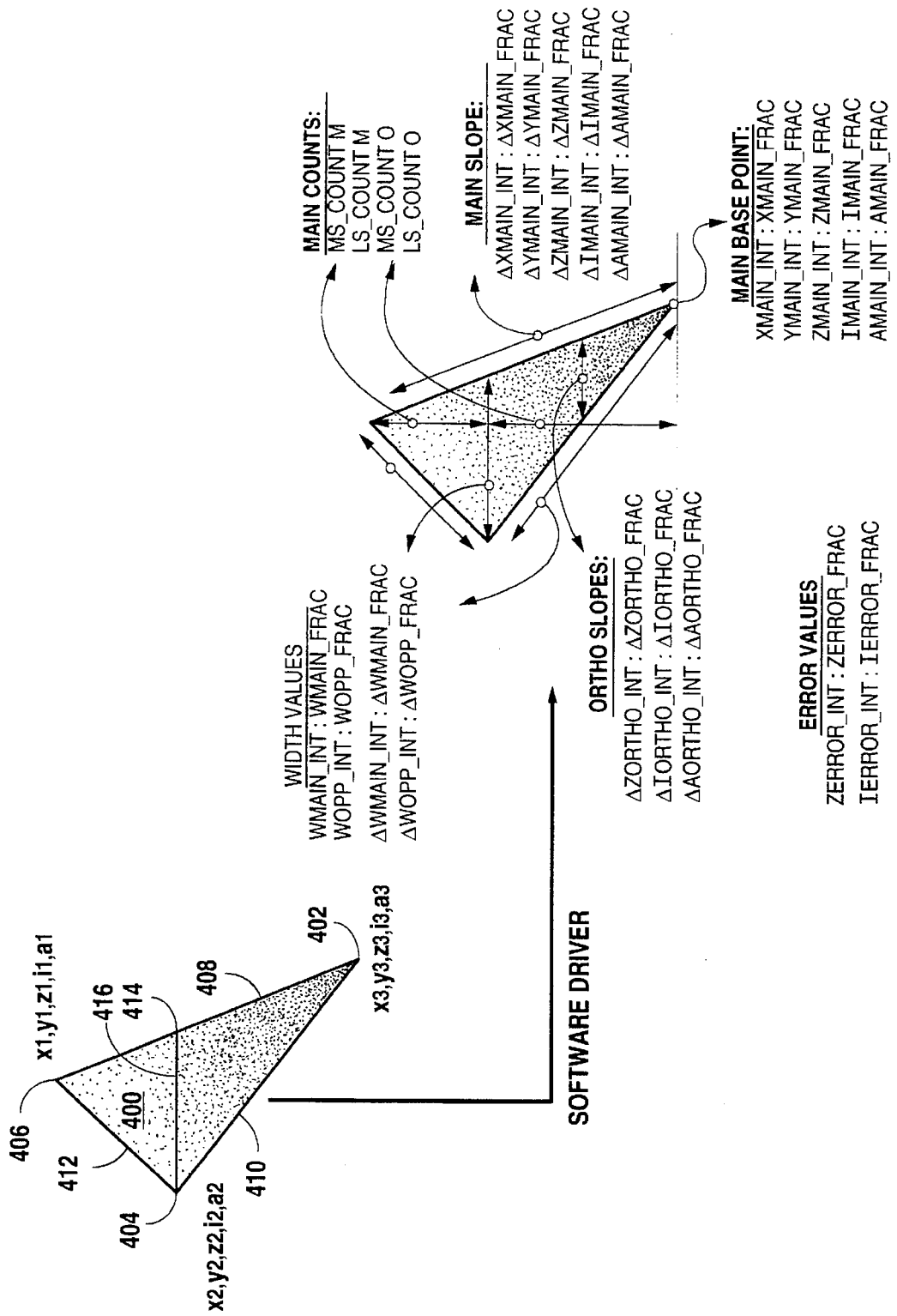
FIG. 4 is a diagram illustrating calculations performed by a software driver for parameterization of a particular triangle.

Referring now to FIG. 4, a diagram is shown illustrating the calculations performed by the software driver executed by the CPU 128 to derive the fractional components for a 3D shaded and alpha-blended triangle 400. It is understood that although more complicated polygons may also be drawn, such as those shown in FIGS. 3A–3C, the triangle 400 will be used to demonstrate the present invention. The triangle 400 is defined by three vertices, including a base point 402, a midpoint 404 and a top or endpoint 406. Therefore, a main slope 408 is defined between the base point 402 and the endpoint 406, and two opposite slopes 410 and 412 are defined between the base point 402 and the midpoint 404, and between the midpoint 404 and the endpoint 406, respectively. The base point 402 is located in the two-dimensional pixel grid having an orthogonal component x3, a vertical component y3, and a depth value z3. The x and y coordinates correspond to a pixel value in the pixel grid within the frame buffer 110, whereas the z depth value is contained within the Z-buffer 122. The base point 402 has an intensity value of i3 and an alpha-blending value of a3. Likewise, the midpoint 404 is defined with parameters x2, y2, z2, i2, and a2 and the endpoint 406 is defined with corresponding parameters x1, y1, z1, i1, a1. It is noted that the depth values preferably vary linearly while traversing the vertical direction of the triangle 400, generally from z3 to z1, and also in the orthogonal direction, generally from z3 to z2. Likewise, the intensity and alpha values vary linearly in the vertical direction from i3 and a3 to i1 and a1, respectively, and in the orthogonal direction from i3 and a3 to i2 and a2, respectively. These values may either increase or decrease.

The software driver receives the parameters x1, x2, x3, y1, y2, y3, z1, z2, z3, i1, i2, i3, a1, a2, a3 and converts these parameters into values defining the base point 402, the main slope 408, and into slope or incremental values defining incremental changes in the width, depth, intensity and alpha parameters relative to the base point 402 and the main slope 408. It is noted that for efficiency and because of the implementation of the VRAMs comprising the frame buffer 110 or the DRAMs comprising the Z-buffer 122, each of the polygons are drawn using orthogonal span lines. A row address is first provided to precharge the RAMs (including VRAMs and DRAMs), where the time for precharging is typically on the order of approximately 80 nanoseconds (ns). Then column addresses are provided to access individual RAMs defining each pixel in the orthogonal row or scan line. In this manner, after the row of RAMs are precharged, column addresses are completed after only approximately 20 ns per pixel. The base point identifies the initial pixel value to be drawn, and the main slope identifies each subsequent initial pixel to be drawn for each consecutive orthogonal span line, where the y coordinate or parameter is preferably incremented by one to address the next orthogonal span line. The width parameter identifies the number of pixels to be drawn per span line and an x direction bit identifies the direction of the span lines. Since each polygon is preferably drawn using orthogonal scan lines as described above, the slope or incremental values calculated by the software driver are determined for the orthogonal and vertical directions.

The software driver is preferably written in the C language, preferably uses floating point or double precision arithmetic to achieve the desired accuracy and provides integer and fractional values for each calculated parameter. The parameters x3, y3, z3, i3 and a3 of the base point 402 are converted directly to integer and fractional values. In particular, the x3 parameter is converted to an integer portion XMAIN_INT and a fractional value XMAIN_FRAC. Likewise, the y3, z3, i3 and a3 parameters are converted to integer and fractional values YMAIN_INT, YMAIN_FRAC, ZMAIN_INT, ZMAIN_FRAC, IMAIN_INT, IMAIN_FRAC, and AMAIN_INT, and AMAIN_FRAC, respectively. The x and y values XMAIN_INT and YMAIN_INT preferably have an integer resolution of 12 bits to address 4,096 pixels, and the fractional values XMAIN_FRAC and YMAIN_FRAC have a pixel resolution of 12 bits to divide each pixel by 4,096. This allows a maximum accumulated error of less than a pixel across a 4096 by 4096 pixel display. The ZMAIN_FRAC and IMAIN_FRAC fractional values also have 12 bits each. The ZMAIN_INT value, however, has 16 bits for a resolution of 65,536 "pixels" for the depth value. The IMAIN_INT or integer portion of the color intensity is preferably 8 bits wide to achieve 256 intensity values for each color. In the preferred embodiment, each of the primary colors red, green and blue have 8-bit intensity values. Finally, the alpha values AMAIN_INT and AMAIN_FRAC are each preferably 8 bits. The software driver preferably uses floating point arithmetic or double precision for the parameters of the other vertices 404 and 406, although these parameters are only used indirectly to calculate incremental values, described further below, and thus are not loaded into the register file 500.

The vertical span of the polygon 400 is calculated as the difference between the y values at the vertices 406 and 402 or the difference between y1 and y3. However, the vertical span is preferably separated into two parts, including a main count value corresponding to the number of vertical pixels in the first opposite slope 410, and an opposite count value corresponding to the number of vertical pixels in the second opposite slope 412. Thus, the main count value is the vertical span between the y parameter of the midpoint 404 and the base point 402, or y2–y3. Only the integer portion of the main count is used and the resulting value is separated into a most significant byte called MS_COUNTM and a least MS_COUNTM:LS_COUNTM, represent the number of orthogonal span lines between the base point 402 and the midpoint 404. Likewise, opposite count values are achieved by subtracting y2–y1 to obtain a most significant opposite count byte MS_COUNTO and a least significant byte LS_COUNTO, where these two values together, MS_COUNTO:LS_COUNTO, represent the number of orthogonal span lines between the midpoint 404 and the endpoint 406. Again, only the integer portion is needed for the opposite count. In this manner, MS_COUNTM:LS_COUNTM orthogonal span lines are drawn tom the base point 402 to the midpoint 404, and MS_COUNTO:LS_COUNTO orthogonal span lines are drawn from the midpoint 404 to the endpoint 406.

The software driver also calculates initial and incremental width values for both the lower or main portion of the triangle 400 between the midpoint 404 and the base point 402, as well as for the opposite or top portion between the endpoint 406 and the midpoint 404. In this manner, the graphics processor 100 uses an initial width value and an incremental width value in order to determine the length of each of the orthogonal span lines to be drawn. The width at the main base point is calculated and converted to integer and fractional values WMAIN_INT and WMAIN_FRAC, where each of these values has a resolution of 12 bits corresponding to the resolution of the x parameters. However, since the base point 402 of the triangle 400 has no width, these values are preferably zero. It is noted, however, that a value other than zero may arbitrarily be loaded into these values in the event the slope of the first opposite slope 410 is very small, near zero. For example, the initial width values of the polygon 300 shown in FIG. 3A are not zero and would be the orthogonal distance between the points 310 and 312.

An incremental value or slope of the width of the triangle 400 is calculated as values ΔWMAIN_INT and ΔWMAIN_FRAC. Since the initial width is zero, these incremental values define the length of an orthogonal line 416 corresponding to the midpoint 404, divided by the change in y from the base point 402 to the midpoint 404, which is y2–y3. Thus, the initial width WMAIN_INT:WMAIN_FRAC is incremented by ΔWMAIN_INT:ΔWMAIN_FRAC for each orthogonal span line. It is noted that variables denoting incremental or slope values are preceded by a delta (Δ) symbol and typically have the same number of bits as their corresponding initial values, although the slope values also typically include a sign bit indicating the direction of change. Concerning the width values, note that although fractional values are used in the calculations for accuracy, only the integer portion is used to determine the actual number of pixels drawn. Also, the software driver determines an x direction bit for defining the direction each span line is written into the frame buffer 110 and/or the Z-buffer 122. For the triangle 360, span lines are written from the main slope 362 at the left towards the opposite slopes 364, 366 for a positive x direction for the polygon 340, however, span lines are written in the opposite or negative x direction.

Interpolation proceeds from the base point 402 to the midpoint 404 to draw the main or lower portion of the triangle 400. When this is completed, the initial width value is replaced by the maximum orthogonal width of the triangle 400 corresponding to the midpoint 404, which is a value WOPP_INT:WOPP_FRAC. This width value is the length of the line 416. Finally an incremental opposite width value ΔWOPP_INT:ΔWOPP_FRAC is the incremental change in the width from one orthogonal span line to the next between the midpoint 404 and endpoint 406. This incremental width value for the opposite slope is calculated in a similar manner as the incremental width values for the main portion.

The software driver also calculates the main slope values, which are the incremental changes in the x, y, z, i, and a parameters corresponding to the changes in the location, depth, color intensity and alpha values along the main slope 408. The x slope is defined as ΔXMAIN_INT:ΔXMAIN_FRAC, which is calculated using the equation (x1−x3)/(y1−y3). Note that this will be a negative value for the triangle 400 since x is decreasing. Since the vertical component y is the main stepping value for each orthogonal span line, the incremental y value ΔYMAIN_INT:ΔYMAIN_FRAC is chosen to be a value of 1, where the YMAIN_INT:YMAIN_FRAC value is incremented by 1 to address the next orthogonal span line. This value could be a negative one (−1) to draw the triangle 400 from top to bottom. The z slope is defined as ΔZMAIN_INT:ΔZMAIN_FRAC and is calculated in a similar manner as the x value using the equation (z1−z3)/(y1−y3). This is the incremental change of the depth parameter along the main slope 408 for the initial pixel of each orthogonal span line. The incremental changes of the color and alpha values, or ΔIMAIN_INT:ΔIMAIN_FRAC and ΔAMAIN_INT:ΔAMAIN_FRAC are calculated in a similar manner, using the equations (i1−i3)/(y1−y3) and (a1−a3)/(y1−y3), respectively.

The software driver also calculates incremental orthogonal values or the changes in the depth, color, and alpha-blending in the orthogonal direction of the triangle 400. These values are ΔZORTHO_INT:ΔZORTHO_FRAC, ΔIORTHO_INT:ΔIORTHO_FRAC and ΔAORTHO_INT:ΔAORTHO_FRAC, respectively. Note that the x parameter is handled with the width values so that no further calculation is necessary. The calculation of the orthogonal slopes are slightly more complicated, but can be determined in any manner consistent with geometric principles. One method is to divide the difference of the z, i and a values between points 414 and 404 by the length of the orthogonal line 416. Of course, the x, z, i and a parameters at the point 414 would have to be derived first. These parameters are derived easily from the parameters of the base point 402 and the endpoint 406 since all of the parameters vary linearly along the main slope 408.

The software driver also determines an error value for the depth parameter including a 16-bit integer ZERROR_INT and a 12-bit fractional portion ZERROR_FRAC. Furthermore, a color intensity error value has an 8 bit integer portion IERROR_INT and a 12 bit fractional portion IERROR_FRAC. These error values are calculated by the software driver and loaded into the register file 500 if error correction is desired. If 0's are loaded into these registers indicating that error correction is not desired, a separate zero detector circuit (not shown) turns off error correction. The depth error value is the orthogonal slope or incremental change of the z parameter in the orthogonal direction multiplied by the fractional portion of the incremental change of the x parameter along the main slope. Likewise, the intensity error value is the orthogonal slope or incremental change of the i parameter in the orthogonal direction multiplied by the fractional portion of the incremental change of the x parameter along the main slope. If the main slope is vertical or diagonal, error correction would not be needed. Thus, the error values take into account the fractional portion of the slant of the main slope in the orthogonal direction. It is noted that the integer portion of the x slope is not used since the error values primarily concern the fractional offsets within the pixels.

For purposes of full disclosure, the calculations performed in the actual code of the software driver will be described briefly for the z orthogonal slope and depth error values. It is understood that the orthogonal slope and error values for intensity are derived in a very similar manner. Also, if error correction is desired for other characteristics such as transparency and texture mapping, the calculations are similar. The span of the x, y and z values along the main slope 408 of the triangle 400 are defined as dx, dy and dz and are calculated as $dx = x1-x3$, $dy = y1-y3$ and $dz = z1-z3$, respectively. Likewise, the span of the x, y and z values along the first opposite slope 410 are defined as dx1, dy1 and dz1 and are calculated as $dx1 = x2-x1$, $dy1 = y2-y1$ and $dz1 = z2-z1$, respectively. Corresponding slopes of the x and z values along the main slope 408 are calculated as xslope=dx/dy and zslope=dz/dy. Also, the slopes of the x and z values along the opposite slope 410 are x1slope=dx1/dy1 and z1slope=dz1/dy1. Orthogonal values of the x values are calculated using the following equations:

$$x\_ortho\_main = x3 + (xslope * dy1 * dy);$$

$$x\_ortho\_end = x3 + (x1slope * dy * dy1);$$

$$dx\_ortho = x\_ortho\_end - x\_ortho\_main;$$

where the asterisk (*) symbol denotes multiplication. A directional value "dir" is equal to 1 if the dx_ortho value is greater than zero, but is −1 otherwise. Orthogonal spans and slopes of the z value are calculated using the following equations:

$$z\_ortho\_main = z3 + (zslope * dy1 * dy);$$

$$z\_ortho\_end = z3 + (z1slope * dy * dy1);$$

$$dz\_ortho = z\_ortho\_end - z\_ortho\_main;$$

$$z\_ortho\_slope = dir * (dz\_ortho / dx\_ortho).$$

Finally, the z or depth error value is then calculated using the following equation:

$$\backslash z\_error = \_dir * z\_ortho\_slope * modf(xslope, \delta dummy);$$

where the modf function returns the fractional portion of the xslope and places the integer portion in a variable pointed by dummy, which is preceded by a pointer symbol (δ). As indicated above, the i or intensity error value is determined in a similar manner. A copy of the source code of the software driver for calculating the parameters is included as Appendix A of this disclosure. The actual code is generalized to handle other types of objects and polygons, so that detailed discussion is beyond the scope of this disclosure.

The following Table 1 is a copy of the register file 500 for containing the fundamental components calculated by the software driver for drawing objects including polygons:

TABLE I

Contents of Register File 500

| 31 | 28 27 | 24 23 | 20 19 | 16 15 | 12 11 | 8 7 | 0 | N | A |
|---|---|---|---|---|---|---|---|---|---|
| MS_COUNTM | | YMAIN_INT | | | YMAIN_FRAC | | | R1 | 28h |
| LS_COUNTM | | ΔYMAIN_INT | | | ΔYMAIN_FRAC | | | R2 | 29h |
| x | y | | XMAIN_INT | | XMAIN_FRAC | | | R3 | 2Ah |
| | | ΔXMAIN_INT | | | ΔXMAIN_FRAC | | | R4 | 2Bh |
| | | | ZMAIN_INT | | ZMAIN_FRAC | | | R5 | 2Ch |
| | | | ΔZMAIN_INT | | ΔZMAIN_FRAC | | | R6 | 2Dh |
| | | | | IMAIN_INT | IMAIN_FRAC | | | R7 | 2Eh |
| | | | | ΔIMAIN_INT | ΔIMAIN_FRAC | | | R8 | 2Fh |
| | | | WMAIN_INT | | WMAIN_FRAC | | | R9 | 30h |
| | | | | ΔWMAIN_INT | ΔWMAIN_FRAC | | | R10 | 31h |
| MS_COUNTO | | WOPP_INT | | | WOPP_FRAC | | | R11 | 32h |
| LS_COUNTO | | ΔWOPP_INT | | | ΔWOPP_FRAC | | | R12 | 33h |
| | | ZERROR_INT | | | ZERROR_FRAC | | | R13 | 34h |
| | | ΔZORTHO_INT | | | ΔZORTHO_FRAC | | | R14 | 35h |
| | | | | IERROR_INT | IERROR_FRAC | | | R15 | 36h |
| | | | | ΔIORTHO_INT | ΔIORTHO_FRAC | | | R16 | 37h |
| | | | | | ΔAORTHO_INT | ΔAORTHO_FRAC | | R17 | 38h |
| AMAIN_INT | | AMAIN_FRAC | | | ΔAMAIN_INT | ΔAMAIN_FRAC | | R18 | 39h |

N = Register Name
A = Register Address

As shown in Table I there are preferably eighteen separate registers R1–R18, each thirty-two bits in width for containing the parameters for the base point, main and opposite counts, main slope, initial and incremented width values, orthogonal incremental values and the error values as described above. The corresponding bit locations of the parameters are located at the top and bottom of the Table I. Bit 31 of the register R3 is the x direction bit defining the direction that each orthogonal span line is drawn. Bit 23 of registers R2 and R4 are sign bits of the incremental slope values for the y and x components, respectively. The sign bits are used as directional values for determining the direction of the main slope in the vertical and horizontal directions. In particular, the y direction is typically positive to draw the polygon from bottom to top, but can also be drawn from top to bottom, where the y value would be negative. Likewise, the x value is negative if the x value decreases along the main slope 408, but is otherwise positive. Sign bits are also provided in registers R4, R6, R8, R10, and R12–18, as shown in Table 1 indicating the directions of each of the corresponding values adjacent the sign bits. In the preferred embodiment, the software driver represents negative numbers in 2's compliment form for simplification of adders and subtractors in the interpolator portions. The sign bits are extended to fill the designated register if no other variables are included, so that the most significant bit (msb) of the register indicates the sign of the number.

Figure 5:
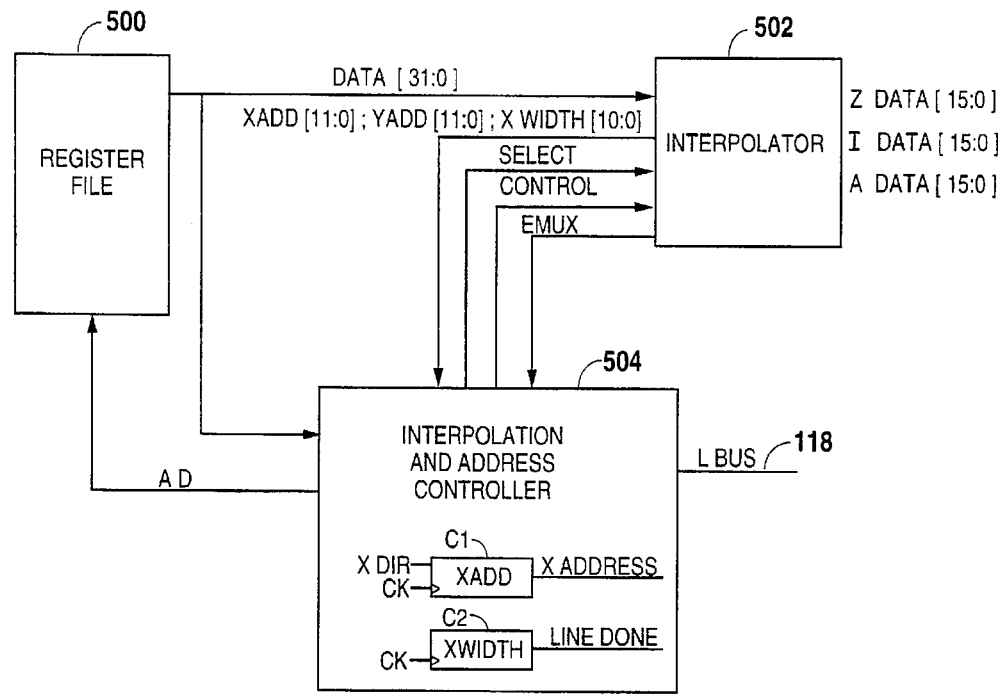
FIG. 5 is a simplified diagram of the polyengine of FIG. 2.

Referring now to FIG. 5, a simplified block diagram is shown of the polyengine 202. The register file 500 is connected to an interpolator 502 through a DATA bus having signals DATA[31:0]. The register file 500 receives addresses on an address bus AD from an interpolation and address controller 504, which also receives the DATA[31:0] signals. The controller 504 asserts addresses on the AD bus corresponding to the register addresses listed in Table I to access the corresponding registers, and the contents of the addressed register is asserted on the DATA[31:0] signals. The controller 504 also asserts corresponding select signals to the interpolator 502 for accessing and loading corresponding registers in the interpolator 502, which receives the data from the DATA bus. The select signals are XMSEL, DXMSEL, YMSEL, DYMSEL, ZMSEL, DZMSEL, IMSEL, DIMSEL, WMSEL, DWMSEL, WOSEL, DWOSEL, ZESEL, DZOSEL, IESEL, DIOSEL, AMSEL, DAMSEL and DAOSEL, which will be described more fully below. The controller 504 asserts various control signals to the interpolator 502, including signals MLOAD, THALF, EINIT, OINIT and ERRLOAD, which also will be described more fully below. The controller 504 also includes internal registers for loading the MS_COUNTM:LS_COUNTM and MS_COUNTO:LS_COUNTO count values and the x direction bit from the register file 500.

The interpolator 502 provides x,y address values to the controller 504 on signals XADD[11:0] and YADD[11:0], respectively, and also provides w width values on signals XWIDTH[10:0]. The controller 504 uses these values to determine the appropriate address to assert on the LBUS 118 to access pixel values in the frame buffer 110. In general, the XADD[11:0] and YADD[11:0] signals indicate the address of the initial pixel to be drawn for each orthogonal scan line, the XWIDTH[10:0] signals indicate the corresponding width of the orthogonal scan line and the x direction bit determines the direction each scan line is drawn. Thus, the controller 504 asserts an address on the LBUS 118 corresponding to the YADD[11:0] signals to precharge that row, and then increments or decrements the XADD[11:0] signals, depending upon the x direction bit, to address individual pixels in that row, one at a time, until the current orthogonal scan line is completed.

In general, XADD[11:0] defines the first pixel, XWIDTH [10:0] is used as a count to determine how many pixels to draw and the x direction bit determines the direction. More particularly, the YADD[11:0] signals are used directly to provide the y address for the pixels. The XADD[11:0] signals are loaded into a counter C1 which also receives the x direction bit, and then counts up or down depending upon the x direction bit. Preferably, if the x direction bit is 0 the counter C1 counts up, but otherwise counts down (negatively if the x direction bit is 1). Pulses provided on clock signal CK control the count. Thus, the counter C1 outputs the x address for the pixels with each pulse of the CK signal. The XWIDTH[10:0] signals are loaded into another counter C2, which is preferably a down-counter and which also receives the CK signal. With each pulse of the CK signal, the counter C3 decrements until reaching 0, at which time it asserts a line done bit indicating that the line is completed. The controller 504 also loads the count values from the registers R1, R2, R11 and R12 into separate registers (not shown) to determine how many orthogonal scan lines to draw. The YADD[11:0] signal is incremented by the interpolator 502 to address the next scan line. The controller 504 then decrements a counter (not shown) loaded with the main count value MS_COUNTM:LS_COUNTM and draws the next scan line, and this process repeats until the first or lower half of the polygon is completed. Then, the MS_COUNTO:LS_COUNTO count values are loaded into the counter and the process is continued in the same manner until the top half of the polygon is drawn.

FIGS. 6A–6H are schematic diagrams showing various portions of the interpolator 502 of the polyengine 202. As described above, the DATA[31:0] signals are provided to load data from the register file 500 into various corresponding registers in the interpolator 502. Thus, once the register file 500 is loaded and an instruction is received for drawing a polygon, the controller 504 loads the registers in the interpolator 502 with the data from the register file 500 through the DATA[31:0] signals. In this manner, the register file 500 is preferably loaded with new values while the present object is being interpolated and drawn. As will be described more fully below, many of the registers are connected to only portions of the DATA[31:0] signals depending upon the resolution of the data. The particular sizes of registers, adders, multiplexers in the Figures are determined for speed, efficiency, and resolution of the parameters, and are not intended to limit the present invention. The sizes of the actual registers are typically 2 bits or more longer than the associated parameters to prevent overflow should an object extend off the screen or out of bounds. In this manner, the logic associated for determining intensity and depth values prevents wrapping so that out of bounds parameters do not wrap back onto the screen.

Figure 6A:
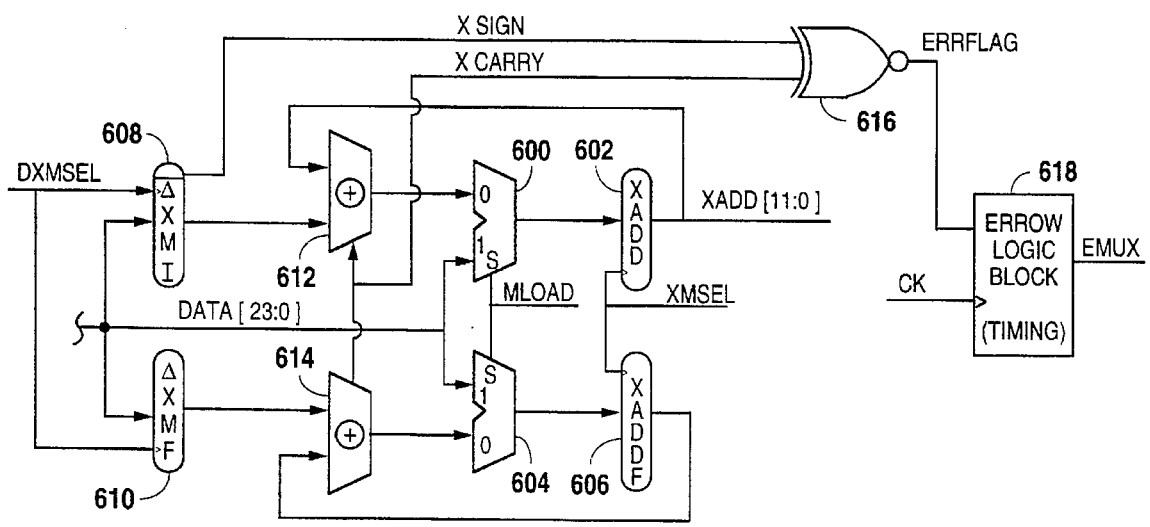
FIGS. 6A–6H are schematic diagrams illustrating various interpolators within the interpolator engine of FIG. 2.

Referring now to FIG. 6A, a schematic diagram of the interpolator for the x parameter is shown. When drawing and filing polygons according to the present invention, this portion of the interpolator provides the x address of the initial pixel along the main slope of the polygon. A two-input 12-bit multiplexer (MUX) 600 receives the DATA[23:12] signals at one input and another two-input 12-bit MUX 604 receives the DATA[11:0] signals at one of its inputs. A signal MLOAD is provided to the select input terminal of the MUXs 600 and 604. The output of the MUX 600 is connected to the input of a 12-bit register XADD 602 for storing the XMAIN_INT value, and the output of the MUX 604 is connected to the input of another 12-bit register XADDF 606, for storing the XMAIN_FRAC value. A signal XMSEL is provided to the clock inputs of both registers XADD 602 and XADDF 606. Similarly, the DATA [23:12] signals are provided to the input of a 12-bit register AXMI 608 for receiving the AXMAIN_INT value, and the DATA[11:0] signals are provided to the input of another 12-bit register AXMF 610 for receiving the AXMAIN_ FRAC value. A signal DXMSEL is provided to the clock inputs of both the AXMI 608 and AXMF 610 registers.

The output of the AXMF register 610 is connected to one input of a 12-bit adder 614, which has its other input connected to the output of the XADDF register 606. The output of the adder 614 is provided to the other input of the MUX 604. The adder 614 provides an overflow output signal referred to as XCARRY. The XCARRY signal is provided to the CARRY (CIN) input of a 12 bit adder 612, which has one input connected to the output of the AXMI register 608 and its other input connected to the output of the XADD register 602. The XCARRY signal is used to indicate when the fractional portion of the orthogonal component carries to the next column of the pixel array in the frame buffer 110, as will be described more fully below. The output of the adder 612 is provided to the other input of the MUX 600. The upper bit of the AXMI register 608 is a signal XSIGN indicating the sign of the x slope parameter. The output of the XADD register 602 provides signals XADD [11:0], which are used as the x address or coordinate of the orthogonal component of the pixel array in the frame buffer 110. The XSIGN and XCARRY signals are provided to the inputs of a two-input exclusive-OR (XOR) gate 616, which provides a signal ERRFLAG at its output. The ERRFLAG signal is provided to an error logic block 618, which receives the CLK clock signal and provides a signal EMUX at its output. The error logic block 618 asserts the EMUX signal after the ERRFLAG signal is asserted, but synchronized with the CK signal and with other interpolators described below. Thus, the error logic block 618 is for timing and synchronization purposes. The EMUX signal will be described more fully below.

The XMAIN_INT and XMAIN_FRAC values from register R3 of the register file 500 are asserted on the DATA[23:0] signals and loaded into the XADD 602 and XADDF 608 registers, respectively, while the MLOAD signal is asserted and the XMSEL and DXMSEL signals are clocked. Likewise, the AXMAIN_INT and AXMAIN_ FRAC values from register R4 are asserted on the DATA [23:0] signals and loaded into the AXMI 608 and AXMF 610 registers, respectively, while the MLOAD signal is asserted and DXMSEL signal is clocked. Once these registers are loaded and the MLOAD signal is negated, the XMSEL and DXMSEL signals are used to interpolate the x value to provide the x address or coordinate of each initial pixel along the main slope. Thus, the XMSEL and DXMSEL signals are asserted after an orthogonal span line is completed 16 begin the next orthogonal span line. Each time the DXMSEL signal is asserted, the contents of the ΔXMF register 610 is added to the contents of the XADDF register 606, and the sum is clocked back into the XADDF register 606. The XCARRY signal indicates when the fractional value overflows to the integer value, which causes the orthogonal span line to carry over another column of pixels. Each time the XMSEL signal is asserted, the contents of the ΔXMI register 608 and the XCARRY signal are added to the contents of the XADD register 602, and the sum is clocked back into the XADD register 602. Only the integer portion, asserted on the XADD[11:0] signals, is used to determine the x coordinate of the pixel. Since the values being added by the adders 612 and 614 are represented in 2's complement form, the XOR gate 616 determines when an overflow of the adder 614 occurs. If the sign of the ΔXMAIN_INT is positive so that the XSIGN signal is 0, an overflow occurs when the XCARRY signal is 1. Otherwise, an overflow occurs when the XCARRY signal is 0.

Figure 6B:
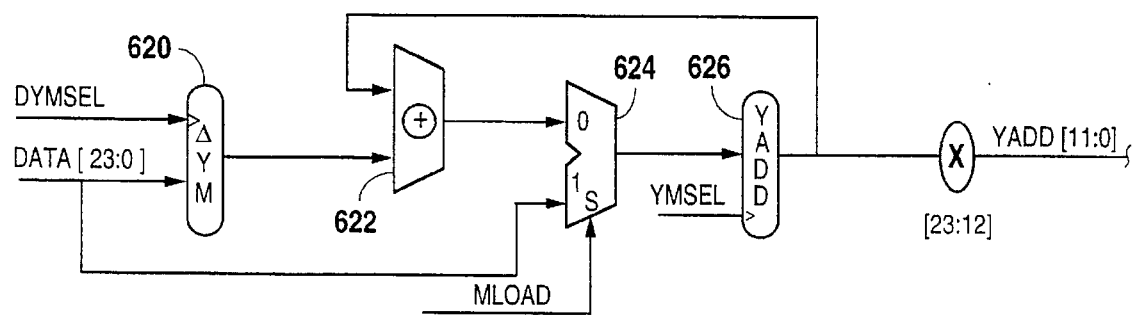

Referring now to FIG. 6B, a schematic diagram of the interpolator for the y parameter is shown. When drawing and filling polygons according to the present invention, this portion of the interpolator provides the y address of the initial pixel along the main slope of the polygon. When drawing and filling polygons in a single command, the incremental value ΔMAIN_INT is set to one and ΔYMAIN_FRAC is set to zero. Thus, the y parameter points to the next orthogonal span line to be drawn in the pixel array. Of course, the incremental value could be set to −1 to draw in the opposite direction, the present invention not being limited to any particular direction. A two-input, 24-bit MUX 624 receives the DATA[23:0] signals at one data input and has its other data input connected to the output of a 24-bit adder 622. It is noted that the integer and fractional portions are combined in a single register rather than being divided into two registers, as was done for the x parameter. A 24-bit register ΔYM 620 receives the DATA [23:0] signals at its input and has its output connected to one input of the adder 622. The clock input of the ΔYM register 620 receives a signal DYMSEL. The other input of the adder 622 is connected to the output of a 24-bit register YADD 626, where the input of the YADD register 626 is connected to the output of the MUX 624 and receives a signal YMSEL at its clock input. The signal MLOAD is connected to the select input of the MUX 624.

The YMAIN_INT and YMAIN_FRAC values from register R1 are asserted on the DATA[23:0] signals and loaded into the YADD register 626 while the MLOAD signal is asserted and when the YMSEL signal is clocked. Likewise, the ΔYMAIN_INT and ΔYMAIN_FRAC values from register R2 are asserted on the DATA[23:0] signals and loaded into the ΔYM register 620 while the MLOAD signal is asserted and when the DYMSEL signal is clocked. A tap 628 receives the integer portion or upper 12 bits [23:12] of the YADD register 626 and provides the YADD[11:0] signals at its output, which determine the y coordinate for each pixel to be drawn.

Once these registers are loaded and the MLOAD signal is negated, the YMSEL signals is clocked to interpolate or increment the y parameter to provide the y address or coordinate of each initial pixel along the main slope, which is also the same y coordinate of each pixel in that orthogonal span line. In this manner, the RAM memory remains in a row precharge state during the entire span line for better speed and efficiency. Each time the YMSEL signal is asserted, the contents of the YADD register 626 is added to the contents of the ΔYM register 620, and the sum is loaded back into the YADD register 626.

Figure 6C:
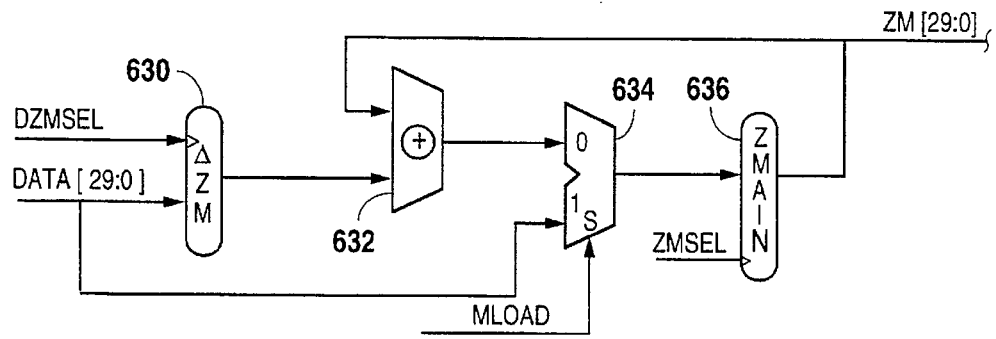

Referring now to FIG. 6C, a schematic diagram of the main slope interpolator for the depth or z parameter is shown. When drawing and filling polygons according to the present invention, this portion of the interpolator provides the depth value of each initial pixel along the main slope of the polygon being drawn, where the depth values are stored in the Z-buffer 122. A two-input, 30-bit MUX 634 receives the DATA[29:0] signals at one input and has its other input connected to the output of a 30-bit adder 632. The adder 632 has one input connected to the output of another 30-bit register ΔZM 630, which receives the DATA[29:0] signals at its input. The clock input of the ΔZM register 630 receives a signal DZMSEL. The other input of the adder 632 is connected to the output of a 30-bit register ZMAIN 636, where the input of the ZMAIN register 636 is connected to the output of the MUX 634. The ZMAIN register 636 receives a signal ZMSEL at its clock input. The signal MLOAD is connected to the select input of the MUX 634.

The ZMAIN_INT and ZMAIN_FRAC values from register R5 are asserted on the DATA[29:0] signals and loaded into the ZMAIN register 636 while the MLOAD signal is asserted and when the ZMSEL signal is clocked. Likewise, the ΔZMAIN_INT and ΔZMAIN_FRAC values from register R6 are asserted on the DATA[29:0] signals and loaded into the ΔZM register 630 while the MLOAD signal is asserted and when the DZMSEL signal is clocked. All 30 bits of the ZMAIN register 636, referred to as the ZM[29:0] signals, provide a partially determined depth value for each initial pixel along the main slope. Once these registers are loaded and the MLOAD signal is negated, the ZMSEL signal is clocked to interpolate the depth parameter, where the contents of the ZMAIN register 636 is added to the contents of the ΔZM register 630, and the sum is loaded back into the ZMAIN register 636. The ZMSEL signal is clocked after the current orthogonal span line is completed, to provide a depth value of the initial pixel of the next orthogonal scan line.

Figure 6D:
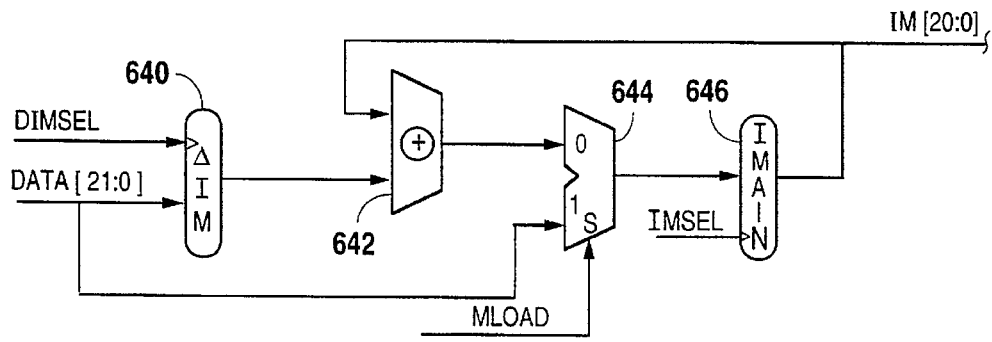

Referring now to FIG. 6D, a schematic diagram of the main slope interpolator for the color intensity parameter is shown. When drawing and filling polygons according to the present invention, this portion of the interpolator provides the intensity value of each initial pixel along the main slope of the polygon being drawn. These values may be modified by the alpha values to simulate transparency. A two-input, 22-bit MUX 644 receives the DATA[21:0] signals at one input and has its other input connected to the output of a 22-bit adder 642. The adder 642 has one input connected to the output of a 22-bit register ΔIM 640, which also receives the DATA[21:0] signals at its input. A signal DIMSEL is provided to the clock input of the ΔIM register 640. The other input of the adder 642 is connected to the output of a 22-bit register IMAIN 646, where the input of the IMAIN register 646 is connected to the output of the MUX 644. The clock input of the IMAIN register 646 receives a signal IMSEL, and the MLOAD signal is connected to the select input of the MUX 644.

The IMAIN_INT and IMAIN_FRAC values from register R7 are asserted on the DATA[21:0] signals and loaded into the IMAIN register 646 while the MLOAD signal is asserted and when the IMSEL signal is clocked. Likewise, the ΔIMAIN_INT and ΔIMAIN_FRAC values from register R8 are asserted on the DATA[21:0] signals and loaded into the ΔIM register 640 while the MLOAD signal is asserted and when the DIMSEL signal is clocked. The upper 21 bits of the IMAIN register 646, referred to as the IM[20:0] signals, provide a partially determined intensity value for each initial pixel along the main slope. Once these registers are loaded and the MLOAD signal is negated, the IMSEL signal is clocked to interpolate the depth parameter, where the contents of the IMAIN register 646 is added to the contents of the ΔIM register 640, and the sum is loaded back into the IMAIN register 646. The IMSEL signal is clocked after the current orthogonal scan line is completed to provide an intensity value of the initial pixel of the next orthogonal scan line.

Figure 6E:
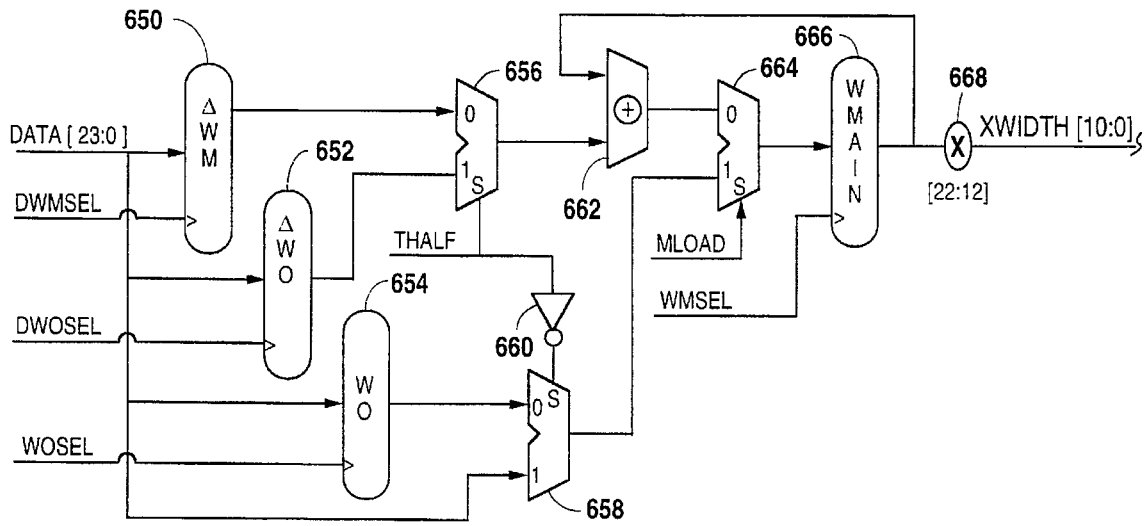

Referring now to FIG. 6E, a schematic diagram of the interpolator for the width parameter is shown. Three registers ΔWM 650, ΔWO 652 and WO 654 each have data inputs for receiving the DATA[23:0] signals and clock inputs receiving signals DWMSEL, DWOSEL and WOSEL, respectively, for loading the width values ΔWMAIN_INT and ΔWMAIN_FRAC, ΔWOPP_INT and ΔWOPP_FRAC, and WOPP_INT and WOPP_FRAC, respectively, from the registers R9, R12 and R11, respectively. A first two-input, 24-bit MUX 656 receives the outputs of the ΔWM 650 and ΔWO 652 registers at its data inputs and receives the THALF signal at its select input. The THALF signal is provided to the input of an inverter 660, which has its output connected to the select input of another two-input, 24-bit MUX 658. One input of the MUX 658 receives the DATA[23:0] signals and its other input is connected to the output of the WO register 654. The output of the MUX 658 is connected to one input of a two-input, 24-bit MUX 664, which provides its output to the input of a 24-bit register WMAIN 666. The output of the WMAIN register 666 is provided to one input of a 24-bit adder 662, which has its other input connected to the output of the MUX 656. The output of the adder 662 is connected to the other input of the MUX 664. The MLOAD signal is provided to the select input of the MUX 664 and the WMAIN register 666 receives a signal WMSEL at its clock input. The upper 11 bits [22:12] at the output of the WMAIN register 666 are connected through a tap 668 to provide signals XWIDTH[10:0], which define the width of the polygon at each orthogonal scan line. Again, the XWIDTH[10:0] signals define a count value for each orthogonal span line to determine the number of pixels per scan line.

While the THALF signal is initially asserted low, the WMAIN_INT and WMAIN_FRAC values from the register R9 in the register file 500 are asserted on the DATA[23:0] signals and loaded into the WMAIN register 666 while the MLOAD signal is asserted and when the WMSEL signal is clocked. When the MLOAD signal is negated and while the THALF signal remains asserted low, the contents of the ΔWM register 650 is added to the contents of the WMAIN register 666 and stored back into the WMAIN register 666 each time the WMSEL signal is clocked. The WMSEL signal is clocked at the beginning of each orthogonal scan line to be drawn while drawing the main portion of the polygon, until the count value MS_COUNTM:LS_COUNTM is completed. Then, the THALF signal is asserted and the MLOAD signal is pulsed to load the WMAIN register 666 with the WOPP_INT and WOPP_FRAC values from the WO register 654. Then, after the MLOAD signal is negated and while the THALF signal is still asserted, the contents of the ΔWO register 652 is added to the contents of the WMAIN register 666 and the sum stored back into the WMAIN register 666 each time the WMSEL signal is clocked. The WMSEL signal is clocked at the beginning of each orthogonal scan line to be drawn while drawing the opposite portion of the polygon, until the count value MS_COUNTO:LS_COUNTO is decremented to zero or otherwise completed, thereby completing the polygon.

Figure 6F:
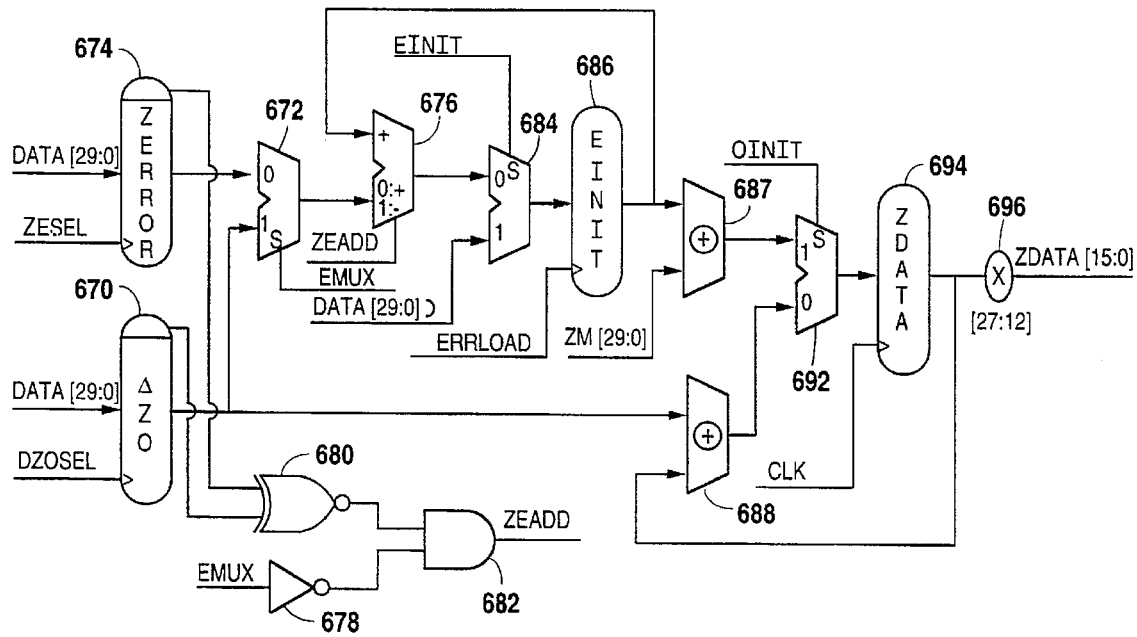

Referring now to FIG. 6F, a schematic diagram of an orthogonal and depth error interpolator for the depth parameter is shown. A signal ZESEL is provided to the clock input of a 30-bit register ZERROR 674, which has its input receiving the DATA[29:0] signals. The ZERROR_INT and ZERROR_FRAC values from register R13 are loaded into the ZERROR register 674 when asserted on the DATA[29:0] signals and when the ZESEL signal is clocked. Likewise, a signal DZOSEL is connected to the clock input of a 32-bit register ΔZO 670, which has its input receiving the DATA[29:0] signals. The ΔZORTHO_INT and ΔZORTHO_FRAC values from register R14 are loaded into the register ΔZO register 670 when asserted on the DATA[29:0] signals and when the DZOSEL signal is clocked.

The output of the ZERROR register 674 is connected to one input of a two-input, 30-bit MUX 672, having its other input connected to the output of the ΔZO register 670. The output of the MUX 672 is connected to one input of a 30-bit arithmetic logic unit (ALU) 676, having its output connected to one input of a two-input, 30-bit MUX 684. The DATA[29:0] signals are provided to the other input of the MUX 684. The output of the MUX 684 is connected to the input of an EINIT register 686, which has its output connected to one input of a 30-bit adder 687 and to the other input of the ALU 676. A signal EINIT is provided to the select input of the MUX 684 and a signal ERRLOAD is provided to the clock input of the EINIT register 686. An initial error value, which is preferably zero, is asserted on the DATA[29:0] signals and loaded into the EINIT register 686 while the EINIT signal is asserted high and the ERRLOAD signal is clocked. Thereafter, the EINIT signal is negated while the polygon is interpolated.

The ZM[29:0] signals are provided to the other input of the adder 687, which has its output connected to one input of a two-input, 30-bit MUX 692. The output of the MUX 692 is connected to the input of a ZDATA register 694, which has its output connected to one input of an adder 688. The other input of the adder 688 is connected to the output of the ΔZ0 register 670. The output of the adder 688 is provided to the other input of the MUX 692. The MUX 692 receives the OINIT signal at its select input. The integer portion bits [27:12] of, the ZDATA register are provided to a tap 696 for providing data signals ZDATA[15:0]. The clock input of the ZDATA register 694 receives a clock signal CLK.

The EMUX signal is provided to the input of an inverter 678 and also to the select input of the MUX 672, where the MUX 672 selects the contents of the ZERROR register 674 when the EMUX signal is asserted high and selects the contents of the ΔZO register 670 when the EMUX signal is asserted low. The output of the inverter 678 is connected to one input of a two-input AND gate 682, having its other input connected to the output of a two-input exclusive-NOR (XNOR) gate 680. The sign or MSB bits of the ZERROR register 674 and the ΔZO register 670 are connected to the two inputs, respectively, of the XNOR gate 680. The output of the AND gate 682 provides a signal ZEADD, which is provided to a control input of the ALU 676. The ALU 676 adds its inputs when the ZEADD signal is asserted low, and subtracts the output of the MUX 672 from the contents of the EINIT register 686 when the ZEADD signal is asserted high.

Once the initial values are loaded into the ZERROR, ΔZ0 and EINIT registers 674, 670 and 686 as described previously, the OINIT signal is asserted and the CLK signal is clocked so that the contents of the ZMAIN register 636 asserted on the ZM[29:0] signals is added to the contents of the EIN_NT register 686 by the adder 687 and the sum is loaded into the ZDATA register 694. Thus, the initial depth value is asserted on the ZDATA[15:0] signals from the ZDATA register 694. If the initial width os zero, such as is the case for the triangle 400 of FIG. 4, the first orthogonal span line is completed with one pixel. However, if the initial width is not zero, the OINIT signal is negated and the CLK signal is asserted for each remaining pixel in the initial orthogonal span line. Each time the CLK signal is asserted, the ΔZORTHO_IN_NT:ΔZORTHO_FRAC value in the ΔZ0 register 670 is added to the contents of the ZDATA register 694 by the adder 688, and the sum is loaded into the ZDATA register 694.

After an orthogonal span line is completed, the ERR-LOAD signal is asserted so that the output of the ALU 676 is loaded into the EINIT register 686. If the sign bit of the depth error value in the ZERROR register 674 is equal to the sign bit of the z orthogonal slope value in the ΔZ0 register 670, the ALU 676 subtracts the contents of the ZERROR register 674 from the contents of the EINIT register 686 while the EMUX signal remains low or 0, and this difference is loaded back into the EINIT register 686. If the sign bits of the z error and orthogonal slope values in these registers 674, 670 are different, however, then the ALU 676 adds the contents of the ZERROR and EINIT registers 674 and 686. Thus, if both values are negative or if the z error value is positive and the z orthogonal slope value is negative, then a positive error value accumulates in the EINIT register 686. Otherwise, a negative value accumulates in the EINIT register 686. In this manner, the error accumulated in the EINIT register has the opposite sign as that of the ΔZORTHO_INT:ΔZORTHO_FRAC value in the ΔZO register 670.

When an overflow of the fractional portion of the x parameter occurs, the EMUX signal is asserted and the ERRLOAD signal is clocked again by the controller 504. When this occurs, the ZORTHO_INT:ZORTHO_FRAC value in the ΔZ0 register 670 is added to the contents of, and stored back into, the EINIT register 686. It is noted that since the sign of the z orthogonal slope value is always opposite that of the error value accumulated in the EINIT register 686, the orthogonal slope value always reduces the absolute value of the error accumulated in the EINIT register 686. In this manner, the error is incrementally accumulated in the EINIT register 686 and then the orthogonal slope value is subtracted out when the fractional portion of the x parameter overflows causing the orthogonal span line to shift one pixel.

Once the contents of the EINIT register 686 are adjusted in the manner described above, the OINIT signal is asserted by the controller 504 and the CLK signal is clocked to load the z value of the initial pixel in the next orthogonal span line into the ZDATA register 694. Then the OINIT signal is negated and the CLK signal is clocked for each adjacent pixel in the orthogonal scan line, where the contents of the ΔZ0 register 670 are once again added to the contents of the ZDATA register 694 for each pixel. In this manner, once the z depth value of the initial pixel value is adjusted by the value accumulated in the EINIT register 686, z depth values of the entire orthogonal span line is correspondingly shifted or otherwise adjusted. Also, when the EMUX signal is asserted, the magnitude of the accumulated error value is reduced by the depth orthogonal slope value, to allow a smooth transition of the depth characteristic when the next orthogonal span line is shifted. It is noted that a shift of the orthogonal span line may occur each time if the value in the ΔXMI register is greater than zero. However, the EMUX signal is only asserted upon fractional overflow in the adder 614.

Figure 6G:
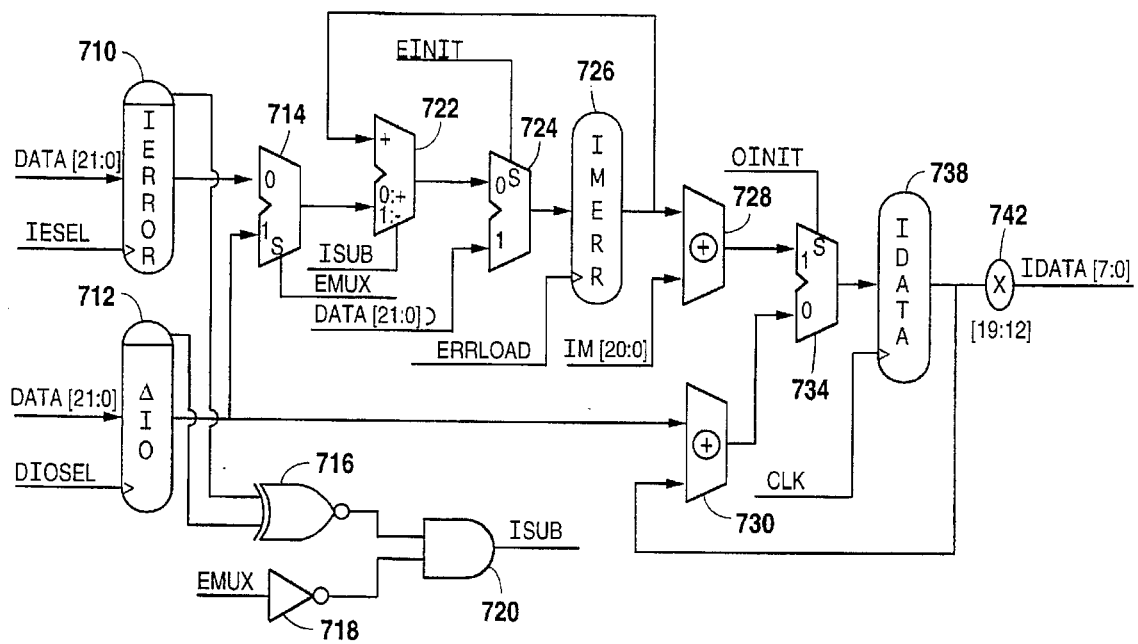

Referring now to FIG. 6G, a schematic diagram of an orthogonal and intensity error interpolator for the intensity parameter is shown. A signal IESEL is provided to the clock input of a 22-bit register IERROR 710, which receives the DATA[21:0] signals at its data input. The IERROR_INT and IERROR_FRAC values from register R15 are loaded into the IERROR register 710 when asserted on the DATA [21:0] signals when the IESEL signal is clocked. A signal DIOSEL is provided to the clock input of a 22-bit register ΔIO 712, which receives the DATA[21:0] signals at its data input. The ΔIORTHO_INT and ΔIORTHO_FRAC values from register R16 are loaded into the ΔIO register 712 when asserted on the DATA[21:0] signals and when the DIOSEL signal is clocked.

The output of the IERROR register 710 is provided to one input of a 22-bit, two-input MUX 714, which has its other input connected to the output of the ΔIO register 712. The select input of the MUX 714 receives the EMUX signal and its output is connected to one input of a 22-bit ALU 722. The output of the ALU 722 is connected to one input of a 22-bit, two-input MUX 724, which has its output connected to the input of a 22-bit register IMERR 726. The output of the IMERR register 726 is connected to the other input of the ALU 722. The MUX 724 receives the EINIT signal at its select input and the IMERR register 726 receives the ERR-LOAD signal at its clock input. Both of the sign bits of the IERROR register 710 and the ΔIO register 712 are provided to both inputs of a two-input XNOR gate 716, which has its output connected to one input of a two-input AND gate 720. The EMUX signal is provided to the input of an inverter 718, which has its output connected to the other input of the AND gate 720. The AND gate 720 provides a signal ISUB at its output, which is connected to the control input of the ALU 722. The ALU 722 adds its inputs if the ISUB signal is low or 0 and subtracts the output of the MUX 714 from the contents of the IMERR register 726 if the ISUB signal is asserted high or 1.

The output of the IMERR register 726 is connected to one input of an adder 728, which receives the IM[20:0] signals at its other input. The output of the adder 728 is connected to one input of a MUX 734. The output of the MUX 734 is connected to the input of an 22-bit register IDATA 738, which has its output connected to one input of an adder 730. The integer output bits [19:12] of the IDATA register 738 are provides to a tap 742, which provides the intensity signals IDATA[7:0] to the operation engine 212. The output of the adder 730 is connected to the other input of the MUX 734. The clock input of the IDATA register 738 receives the CLK signal, and the MUX 734 receives the OINIT signal at its select input. The output of the ΔIO register 712 is connected to the other input of the adder 730.

The operation of the intensity orthogonal slope and i error value interpolator is very similar to the operation described above for the z orthogonal slope and z error value interpolator described above. Once again, an initial intensity error value is loaded into the IMERR register 726 when the EINIT signal is asserted and the ERRLOAD signal is clocked. This value, which is preferably zero, is added to the IM[20:0] signals from the register 646 by the adder 728 and loaded into the IDATA register 738 while the OINIT signal is asserted and when the CLK signal is clocked. Thereafter, the EINIT signal is negated and the ERRLOAD signal is clocked for the initial pixel of each orthogonal span line. In this manner, the intensity of each initial pixel at the beginning of each orthogonal span line is corrected by the accumulated intensity error value stored in the IMERR register 726.

The contents of the IERROR register 710 is either added to or subtracted from the contents of the IMERR register 726 each time the ERRLOAD signal is clocked and while the EMUX signal is negated low. In a similar manner as described above for the depth error value, if the sign of the intensity orthogonal slope value in the ΔIO register 712 is negative, the accumulated intensity error value in the IMERR register 726 is positive and vice-versa. If the EMUX signal is asserted indicating an overflow of the fractional portion of the x parameter, the intensity orthogonal slope value is added to the contents of the IMERR register 726 to reduce the magnitude of the accumulated intensity error. Once the intensity value of the initial pixel in the orthogonal span line is determined in this manner and loaded into the IDATA register 738, the OINIT signal is negated and the remaining intensity value for the orthogonal span line are interpolated each time the CLK signal is clocked, where the contents of the ΔIO register 712 are added to the contents of, and stored back into, the IDATA register 738.

As for the z error values, the i intensity error values accumulated in the IMERR register 728 incrementally shift the intensity values of each pixel in the orthogonal span line until the accumulated error rises above the intensity or orthogonal slope value. This occurs when the fractional portion of the x parameter overflows, causing the initial pixel to jump one additional column over. At this point, the intensity orthogonal slope is added in to reduce the magnitude of the accumulated intensity error value and to adjust the intensity value of the initial pixel of the next orthogonal span line. In this manner, the intensity values across the face of the polygon have less differential resulting in smoother color transition of the shading.

Figure 6H:
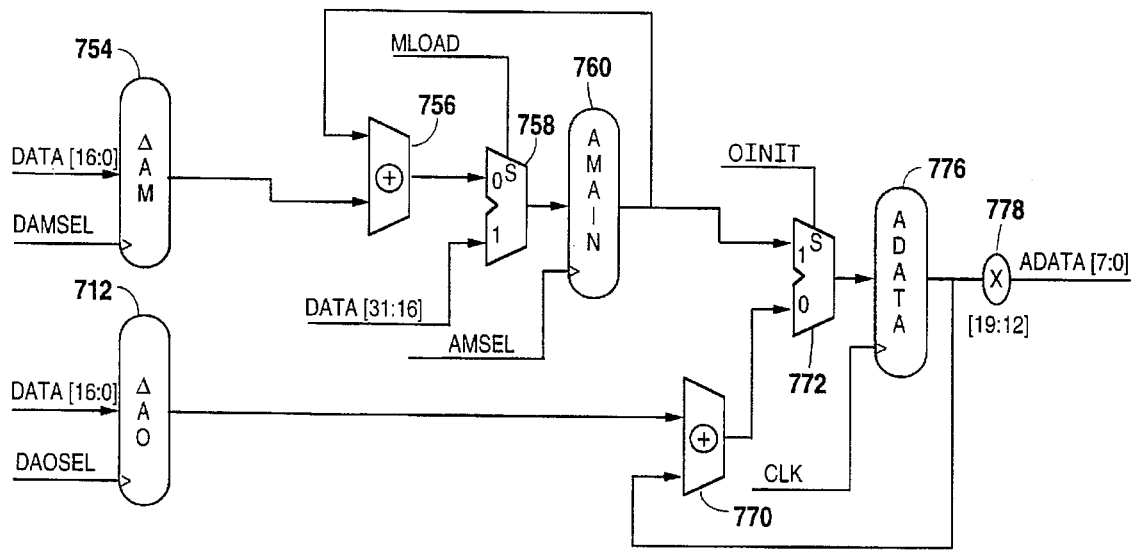

Referring now to FIG. 6H, a schematic diagram of an interpolator for the alpha values is shown. A signal DAOSEL is provided to the clock input of a 17-bit register ΔAO 752 and a signal DAMSEL is connected to the clock input of a 17-bit register ΔAM 754. The DATA[15:0] signals are provided to the inputs of the ΔAM register 754 and the ΔAO 752. Thus, the ΔAORTHO_INT and ΔAORTHO_FRAC values from the register R17 are loaded into the ΔAO register 752 when asserted on the DATA[15:0] signals and when the DAOSEL signal is clocked. Likewise, the values ΔAMAIN_INT and ΔAMAIN_FRAC values from register R18 are loaded into the ΔAM register 754 when asserted on the DATA [15:0] signals and when the DAMSEL signal is clocked. The DATA[31:16] signals are provided to one input of a two-input, 17-bit MUX 758, which receives the MLOAD signal at its select input. The output of the MUX 758 is provided to the input of a 17-bit register AMAIN 760, which receives a signal AMSEL at its clock input. The AMAIN_INT and AMAIN_FRAC values from register R18 are loaded into the AMAIN register 760 when asserted on the DATA[31:16] signals while the MLOAD signal is asserted and when the AMSEL signal is clocked. It is noted that the ΔAM and AMAIN registers 754, 760 are preferably loaded at the same time from register R18.

The output of the ΔAO register 752 is connected to one input of a two-input, 17-bit adder 770. The output of the adder 770 is provided to one input of a 17-bit, two-input MUX 772, which has its output connected to a 17-bit register ADATA 776. The ADATA register 776 receives the CLK signal at its clock input, and its output integer bits [19:12] are provided to a tap 778, which correspondingly provides the ADATA[7:0] signals. The output of the ADATA register 776 is provided to the other input of the adder 770. The select input of the MUX 772 receives the OINIT signal. The output of the ΔAM register 754 is connected to one input of a 17-bit adder 756, which has its output connected to the other input of the MUX 758. The output of the AMAIN register 760 is provided to the other input of the adder 756, and also to the other input of the MUX 772.

Figure 7:
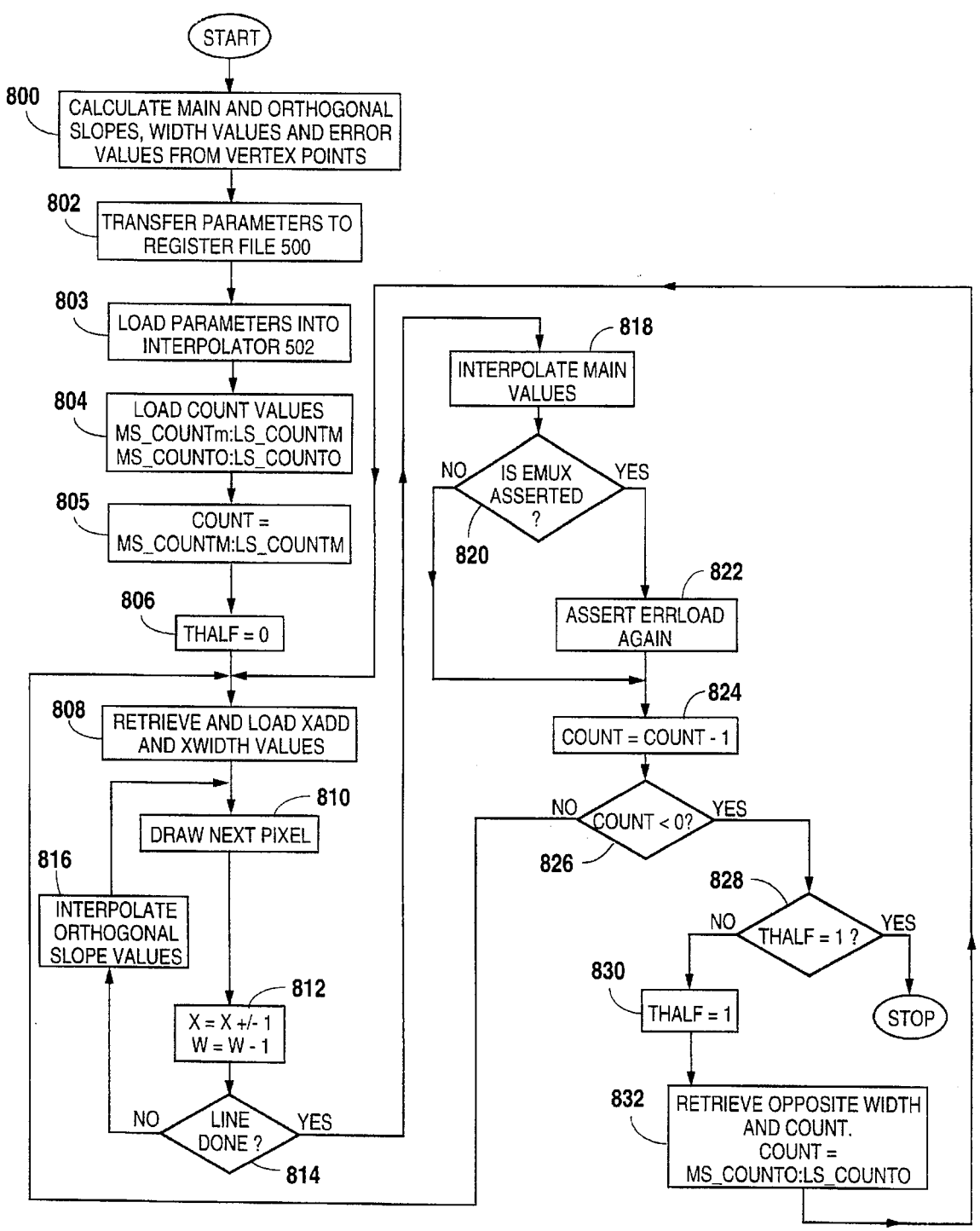
FIG. 7 is a flowchart diagram illustrating the interpolation procedure performed by the software driver and the graphics processor of FIG. 1.

Referring now to FIG. 7, a flowchart diagram is shown illustrating the interpolation procedure performed by the software driver and the controller 504 to control the interpolator 502. Operation begins at step 800 where the software driver executed by the CPU 128 receives the vertex points of a polygon and correspondingly calculates the parameters for the base point, the main and orthogonal slopes, as well as the depth and intensity error values. Of course, an error value for the alpha values could also be calculated at this time. Operation proceeds to step 802 where either the CPU 128 or the graphics processor 100 transfers the calculated parameters to the private memory 116, and thereafter the parameters are transferred to the register file 500 within the graphics processor 100. Operation proceeds to step 803, where the controller 504 receives instructions from the instruction decode and control logic 204 to begin the interpolation process. Thus, the controller 504 loads the parameters from the register file 500 into the various registers of the interpolator 502.

From step 803, operation proceeds to step 804, where the count values MS_COUNTM:LS_COUNTM and MS_COUNTO:LS_COUNTO are loaded into corresponding registers within the controller 504. Operation proceeds to step 805, where a count value is set equal to the MS_COUNTM:LS_COUNTM value. The count value may be implemented by a timer or counter and incremented or decremented as known to those skilled in the art. From step 805, operation proceeds to step 806 where the controller sets the THALF signal 20 to initiate drawing the first or lower half of the polygon.

Operation then proceeds to step 808 where the controller 504 loads the x parameter from the XADD[11:0] signals into the counter C1 and loads the w width parameter from the XWIDTH[10:0] signals into the counter C2. Operation proceeds to step 810 where the next pixel is drawn, which during the first iteration is the first or base point of the polygon. It is noted that even if the width is zero, at least one pixel will be drawn during step 810. To draw a pixel, the controller 504 asserts the appropriate address on the LBUS 118 to access the corresponding pixel in the frame buffer 110, while the operation 212 and the OFIFOs 214 also assert the appropriate characteristic values for loading into the frame buffer 110. The interpolator 502 provides the appropriate ZDATA, IDATA and ADATA values to the operation engine 212 and the Z-buffer comparator 206, as described previously.

From step 810, operation proceeds to step 812 where the x address in the counter C1 is either incremented or decremented by 1, depending upon the x direction bit. Also, the width value in the counter C2 is decremented. Operation then proceeds to step 814, where the line done bit is checked to determine whether the current orthogonal span line is completed or not. It is noted that the direct use of the width value as a count provides fast and efficient performance rather than using maximum and incremented x values and a comparator. If it is determined in step 814 that the orthogonal span line is not yet complete, operation proceeds to step 816, where the controller 504 interpolates the orthogonal slope values for the depth, intensity and alpha values. In this case, the OINIT is negated so that the controller 504 asserts the CLK signal to clock the ZDATA, IDATA and ADATA registers 694, 738 and 776. As described previously, the values in these registers are incremented through the adders 688,730 and 770, respectively, by the values in the ΔZO, ΔIO and ΔAO registers 670, 712 and 752, respectively. From step 816, operation proceeds back to step 810 to draw the next pixel with the new characteristic values.

Referring back to step 814, if it is determined that the current orthogonal span line is complete, operation proceeds to a step 818 where the controller 504 interpolates the main slope values for the parameters x, y, z, i, a and w. Thus, the controller 504 clocks the XMSEL, YMSEL, ZMSEL, IMSEL, WMSEL and AMSEL signals to clock the XADD, YADD, ZMAIN, IMAIN, WMAIN and AMAIN registers 602, 626, 636, 646, 666 and 760, respectively. Also, the ERRLOAD signal is asserted to clock the EINIT and IMERR registers 786, 726, respectively, to load in the error values from the ZERROR and IERROR registers 674 and 710. While the OINIT signal is asserted, the CLK signal is asserted to clock the ZDATA, IDATA and ADATA registers 694, 638 and 776. In this manner, the main values are interpolated to determine the characteristics of the initial pixel of the next orthogonal span line.

From step 818, operation proceeds to step 820, where the controller 504 determines if the EMUX signal is asserted indicating the need to reduce the magnitude of the accumulated error values in the EINIT and IMERR registers 686 and 726. If so, operation proceeds to step 822 where the ERRLOAD signal is again asserted while the EMUX signal is asserted to add the contents of the ΔZO and ΔIO registers 670, 712 to the contents of the registers EINIT and IMERR 686, 726, respectively. If the EMUX signal is not asserted as determined in step 820 or after step 822 is performed, operation proceeds to step 824.

In step 824, the count value indicating the number of orthogonal lines is decremented. From step 824, operation proceeds to step 826 where the controller 504 compares the count to 0. If the count is not less than 0, then more orthogonal lines must be drawn and operation proceeds back to step 808 where a new x' value is calculated. However, if the count has become less than 0 in step 826, operation proceeds to step 828, where the controller 504 compares the THALF signal to 1. If the THALF signal equals 1 in step 828, then the polygon has been completely drawn, and operation terminates. However, if the THALF signal does not equal 1, operation proceeds to step 830 where the THALF signal is set equal to 1. Then operation proceeds to step 832 where the controller 504 retrieves the opposite width values from the interpolator 502, and loads the opposite count values MS_COUNTO:LS_COUNTO into the count value. To load the width values, the MLOAD signal is asserted and the WMSEL signal is clocked to load the initial opposite width value loaded in the WO register 654 to the WMAIN register 666. Thereafter, the MLOAD signal is negated and since the THALF signal now equals 1, the contents of the ΔWO register 652 will be added to the contents of the WMAIN register 666 through the adder 662 and loaded back into the WMAIN register 666 with each assertion of the WMSEL signal. From step 832, operation proceeds back to step 808 to draw the opposite portion of the polygon in a similar manner as the main portion.

Figure 8A:
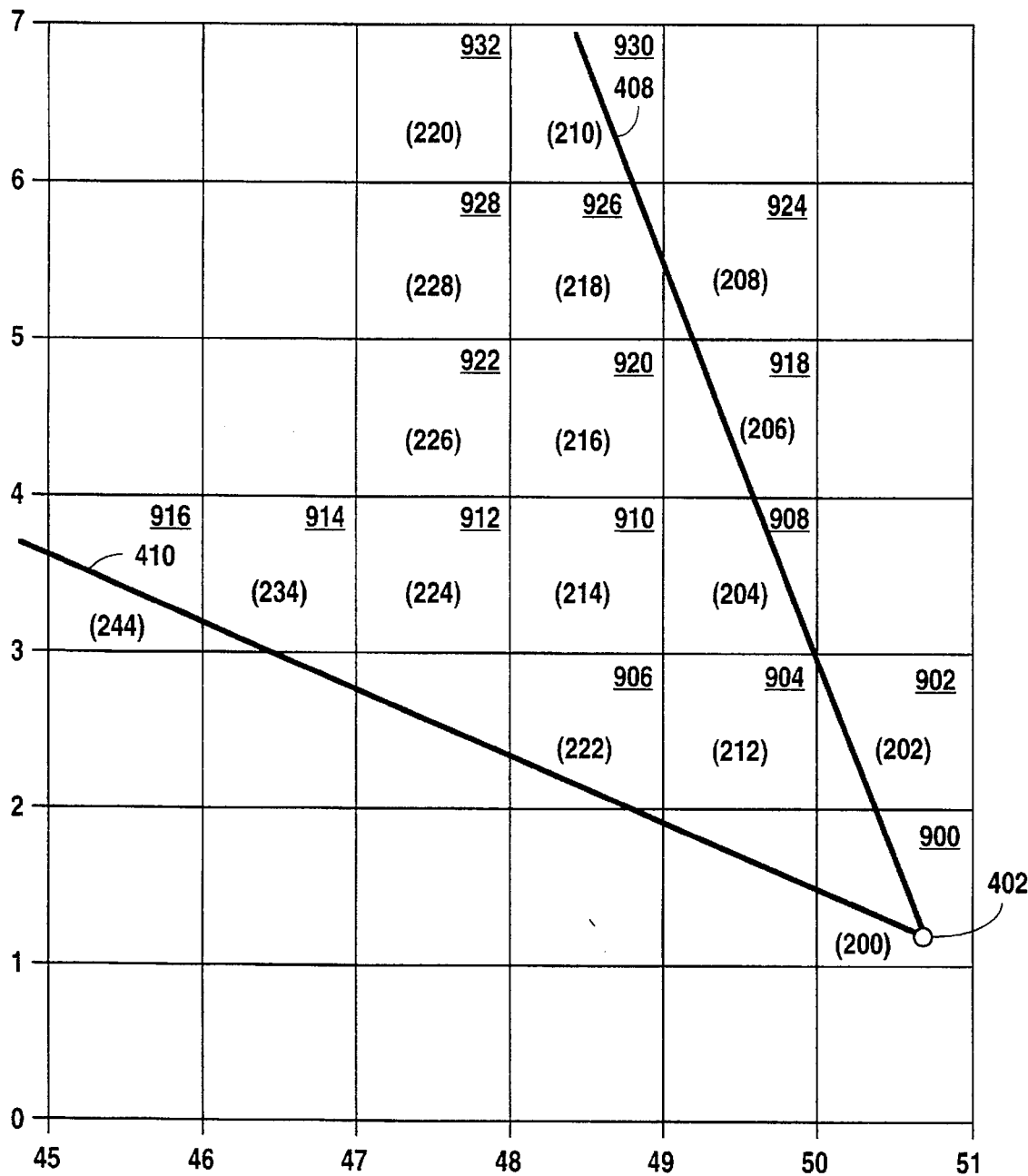
FIG. 8A is a graph illustrating a portion of a polygon and calculated values without any error correction.

A simplified example is provided to illustrate the drawing and filling of polygons, as well as the benefits of the error correction according to the present invention. Referring now to FIG. 8A, an enlarged graphical diagram is shown near the base point 402 of the triangle 400 superimposed upon a pixel grid. Only a small portion of the triangle 400 is shown. Also, only the orthogonal slopes of the color intensity or i values will be described and the z depth values are ignored. Nonetheless, the principles are very similar. Digital rather than binary values are used for the x, y, and color values, so that the fractional portion will be expressed in 1/10ths for simplicity. Each grid square represents a pixel and the corresponding intensity value for each pixel is provided in brackets ().

The base point 402 is within a pixel 900 and has an initial intensity value of 200. The incremental change or slope of the intensity is +2 along the main slope 408. The orthogonal slope of the intensity value is +10, and the x slope or change of the x value along the main slope 408 is −0.4. The initial width is zero and the incremental width is −2.0, so that the pixels will be drawn from right to left, or from the main slope 408 to the opposite slope 410. The x, y parameters of the base point 402 are 50.7 and 1.2, respectively. The y value is incremented by 1 for each span line. The fractional portion of the x parameter is initially +0.7, and the x value is incremented by −0.4 with each increment of the y value to locate the initial pixel in each scan line. Thereafter, the x values are incremented by −1 to finish the orthogonal scan line until the full width is completed.

Since the initial width value at the base point 402 is 0, only the pixel 900 is drawn in the first orthogonal span line, and it has an intensity value of 200. On the next iteration, the y value is incremented by 1 and the x value is incremented by −0.4 to 50.3, which identifies a new pixel 902 just above pixel 900. Since error correction is not taken into account in FIG. 8A, the color value for the pixel 902 is selected at 200+2 for a value of 202. The width is incremented by −2 and added to the new initial x value to identify the x value of the last pixel as 48.3. Thus, two more pixels 904 and 906 are drawn along the next orthogonal scan line adjacent pixel 902. The pixels 904 and 906 have intensity values 212 and 222, respectively, since the orthogonal slope of the intensity value is +10 per pixel.

The x and y values are again incremented along the main slope, so that the new initial x value is 49.9. This increment caused an overflow of the fractional portion of the x value so that the integer portion was reduced by one and a corresponding shift occurred one pixel to the left, which is pixel 908. The pixel 908 has an intensity value of 204 since the intensity of the pixel 902 is incremented by 2 along the main slope 408. The procedure continues in a similar manner described above so that four more pixels 910, 912, 914 and 916 are drawn, having intensity values 214, 224, 234 and 244, respectively. Notice that this causes a large difference of 8 intensity units between vertically adjacent pixels 904, 908 and the pixels 906, 910, whereas the difference between vertically adjacent pixels 900, 902 was only 2. This large discrepancy causes a banding effect which is noticeable by the eye. The procedure is continued for the next scan line, although only the first three pixels 918, 920 and 922 are shown having intensity values 206, 216 and 226, respectively. Also, the three pixels 924, 926 and 928 of the next scan line are shown having intensity values 208, 218 and 228, respectively, and the first two pixels 930, 932 of the next scan line are shown with intensity values 210 and 220, respectively. The x value of pixel 924 is 49.1, so that an additional increment of −0.4 causes an overflow of the integer portion to achieve a value of 48.7 at the pixel 930. Once again, a large discrepancy of 8 intensity units occurs between vertically adjacent pixels 926, 930 and pixels 928, 932. The large discrepancy between adjacent scan lines beginning with initial pixels 902 and 908 and between 924 and 930 causes a banding effect across the face of the triangle 400.

Figure 8B:
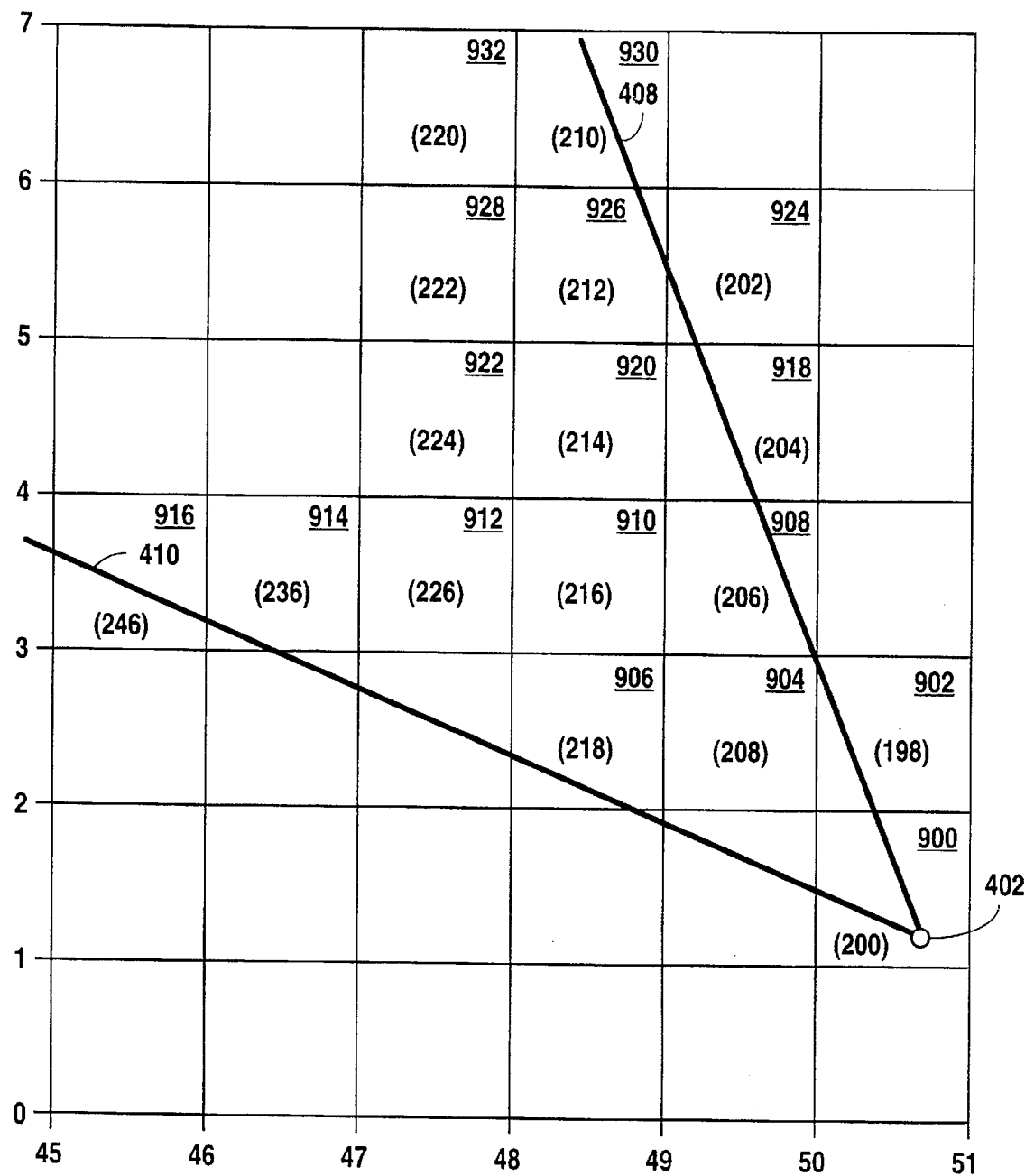
FIG. 8B is a graph similar to that shown in FIG. 8A, except showing calculations using error correction.

Referring now to FIG. 8B, a similar diagram is shown of the base portion of the triangle 400 except incorporating incremental orthogonal error correction. The intensity error value is calculated as the slope of x along the main slope 408 multiplied by the orthogonal slope value, or (−0.4)*(10), which equals −4. Thus, after the main slope value of +2 is added, the error value of −4 is also added for each initial pixel along the main slope 408. The initial pixel 900 still has an intensity value of 200. However, on the next scan line, the pixel 902 has an intensity value of 202−4=198. The remaining pixels 904 and 906 in the scan line have intensity values 208 and 218, respectively. So far, the accumulated error is −4. On the next scan line, the error value accumulates to a value of −8, but since the fractional component of the x value overflows, the orthogonal slope of +10 is added to achieve an adjusted error value of +2. It is noted that this is the accumulated error value with respect to the initial base point pixel 900 rather than pixel 902. Also, the accumulated main slope value has accumulated to +4. The orthogonal scan line begins one column over at pixel 908 as described before for FIG. 8A, except the intensity value is calculated as 200+2+4=206. The remaining pixels 910, 912, 914 and 916 have intensity values 216, 226, 236 and 246, respectively, adding the orthogonal slope of the intensity value of +10 per pixel.

Thereafter, the process continues, so that the pixels 918, 920, 922, 924, 926, 928, 930 and 932 have intensity values 204, 214, 224, 202, 212, 222, 210 and 220, respectively. The accumulated intensity error at pixels 918, 924 and 930 is −2, −6 and 0, respectively. It is noted that the pixels 930 and 932 have the same intensity values with or without error correction. However, the vertically adjacent pixels 904, 908, 918 and 924, the vertically adjacent pixels 906, 910, 920, 926 and 930 as well as the vertically adjacent pixels 912, 922, 928 and 932 all have smooth and consistent intensity differences of 2 without any large discrepancies or anomalies. It is further noted that although the intensity values are decreasing from one orthogonal scan line to the next, rather than increasing, this decrease is appropriate since the first opposite slope 410 has much larger intensity values compared to the main slope 408. Thus, the intensity values shown in FIG. 8B are more correct than those shown in FIG. 8A. In this manner, adjacent pixels have consistent intensity differentials, resulting in smoother transitions and no banding effect. This error correction is applied in like manner to correct the depth values, so that intersection lines appear straight rather than jagged.

It can now be appreciated that the incremental orthogonal error correction method and apparatus according to the present invention achieves monotonic shading of coplanar polygons and straightens the intersection line between copolygons drawn in 3D space. Furthermore, the error correction process according to the present invention could be applied to other characteristics, such as alpha values for transparency purposes, to reduce anomalies in those characteristics. In brief, error values are calculated based upon the slope of the main slope of a polygon and the orthogonal slopes of one or more characteristics across the face of the polygon. While interpolating the polygon into a pixel grid, the error values are added in or otherwise accumulated to shift the orthogonal values for each orthogonal span line to adjust the characteristics of adjacent orthogonal span lines based on the error values. The error values accumulate until an increment to the next orthogonal span line causes the fractional component of the x parameter to overflow, thereby causing the next orthogonal span line to shift an additional pixel. When this occurs, the orthogonal slope values are added in to reduce the accumulated error values. This causes an appropriate shift of the characteristics from one orthogonal scan line to the next to prevent an abrupt change in the characteristic when the orthogonal scan line shifts. This results in smoother transitions of the characteristics from one pixel to the next in the orthogonal and vertical directions.

Although the method and apparatus of the present invention has been described in connection with the preferred embodiment, it is not intended to be limited to the specific from set forth herein, but on the contrary, it is intended to cover such alternatives, modifications, and equivalents, as can be reasonably included within the spirit and scope of the invention as defined by the appended claims.

Appendix A

Title: Incremental Orthogonal Error Correction for 3D Graphics

Inventor: Thomas A. Dye

Atty Docket No.: A94128US 14203002.pat.apd

```c
/*      FILENAME: driver.c

DESCRIPTION: Code for building commands for teen ninja.

AUTHOR: James Irwin Mealy
*/ include <stdio.h>
include <math.h>
#include "display.h"
#include "teenvti.h"

/*#define DEBUG*/
/*#define NO_ERROR_CRR*/

/* programs in this file */
void    make_poly();
void    make_vector();
void    make_poly_vector();
void    make_fixed_screen_blt();
void    make_fixed_host_blt();
void    make_host_screen_blt();
void    make_screen_screen_blt();
void    print_status();
void    make_complex_blt();
void    make_string_blt();
#ifdef diana
double modf(double, double *);
#endif /* diana */

/*************************************************************************/
void make_fixed_screen_blt (unsigned *command, FIX points[4])
{
        int             length;
        int             width;
        int             delta_y;
        unsigned        pbv;
        unsigned        pbh;

length = points[3] - points[1];
        length >>= 12;
        width = points[2] - points[0];
        if (length < 0)
```

```c
        {
                pbv = 1;
                length *= -1;
                delta_y = -4096;
        }
        else
        {
                pbv = 0;
                delta_y = 4096;
        }
        if (width < 0)
        {
                pbh = 1;
                width *= -1;
        }
        else
                pbh = 0;
        *(command + 1) = points[1] | ((length >> 8) << 24);
        *(command + 2) = (delta_y & 0x00ffffff) | ((length & 0x000000ff) << 24);
        *(command + 3) = (points[0] & 0x00ffffff) | (pbv << 30) | (pbh << 31);
        *(command + 4) = width;
#ifdef DEBUG
        printf("ym.in:%x ym.sl:%x xm.in:%x wm.sl:%x\n",*(command + 1),*(command + 2),

*(command + 3),*(command + 4));
#endif
}
/**********************************************************************/
void make_fixed_host_blt (unsigned *command, FIX points[4],
                          unsigned host_base_value)
{
        int             length;
        int             width;
        int             delta_y;
        unsigned        pbv;
        unsigned        pbh;

length = points[3] - points[1];
        length >>= 12;
        width = points[2] - points[0];
        if (length < 0)
        {
                pbv = 1;
```

```
            length *= -1;
            delta_y = -4096;
    }
    else
    {
            pbv = 0;
            delta_y = 4096;
    }
    if (width < 0)
    {
            pbh = 1;
            width *= -1;
    }
    else
            pbh = 0;
    *(command + 1) = points[1] | ((length >> 8) << 24);
    *(command + 2) = (delta_y & 0x00ffffff) | ((length & 0x000000ff) << 24);
    *(command + 3) = (points[0] & 0x00ffffff) | (pbv << 30) | (pbh << 31);
    *(command + 4) = width;
    *(command + 5) = host_base_value;
#ifdef DEBUG
    printf ("ym.in:%x ym.sl:%x xm.in:%x wm.sl:%x\n",*(command + 1),*(command + 2),

*(command + 3),*(command + 4));
#endif
}

/****************************************************************************/
/* diana NOTE: points don't get referenced in make_string_blt      */
/****************************************************************************/
#ifdef orig
void make_string_blt (unsigned *command, FIX points[4], char letters[])
#else
void make_string_blt (unsigned *command, FIX points[4], unsigned char letters[])
#endif
{
        int i;
#ifdef DEBUG
        int j;
endif /* DEBUG */ unsigned dx, w;
        unsigned offset;
```

```c
        i = 0;
        while (*letters)
        {
                w = 15;
                dx = 16;
                offset = *letters - 'a';
                *(command+i+1) = (dx << 24) | (w << 16) | ((offset * 256) & 0x0000ffff);
                letters++;
                i++;
        }
        *command |= (i & 0x0000007f);

#ifdef DEBUG
        for (j=0; j<=i; j++)
                printf ("command[%d]:%x\n",j,*(command+j));
#endif

}

/*********************************************************************/
void make_host_screen_blt (unsigned *command, FIX points[4],
                        unsigned host_base_value)
{
        int        length;
        int        width;
        int        delta_y;
        unsigned   pbv;
        unsigned   pbh;

/* HP derived from host_base_value */
        /* XY derived from points */ length = points[3] - points[1];
        length >>= 12;
        width = points[2] - points[0];
        if (length < 0)
        {
                pbv = 1;
                length *= -1;
                delta_y = -4096;
        }
        else
        {
```

```
                pbv = 0;
                delta_y = 4096;
        }
        if (width < 0)
        {
                pbh = 1;
                width *= -1;
        }
        else
                pbh = 0;
        *(command + 1) = points[1] | ((length >> 8) << 24);
        *(command + 2) = (delta_y & 0x00ffffff) | ((length & 0x000000ff) << 24);
        *(command + 3) = (points[0] & 0x00ffffff) | (pbv << 30) | (pbh << 31);
        *(command + 4) = width;
        *(command + 5) = host_base_value;
#ifdef DEBUG
        printf("ym.in:%x ym.sl:%x xm.in:%x wm.sl:%x\n",*(command + 1),*(command + 2),

*(command + 3),*(command + 4));
#endif
}

/***********************************************************************/
void make_screen_screen_blt (unsigned *command, FIX points[4],
                unsigned host_base_value)
{
        int        length;
        int        width;
        int        delta_y;
        unsigned   pbv;
        unsigned   pbh;

/* HP derived from host_base_value */
        /* XY derived from points */ length = points[3] - points[1];
        length >>= 12;
        width = points[2] - points[0];
        if (length < 0)
        {
                pbv = 1;
                length *= -1;
                delta_y = -4096;
```

```
            }
            else
            {
                    pbv = 0;
                    delta_y = 4096;
            }
            if (width < 0)
            {
                    pbh = 1;
                    width *= -1;
            }
            else
                    pbh = 0;
            *(command + 1) = points[1] | ((length >> 8) << 24);
            *(command + 2) = (delta_y & 0x00ffffff) | ((length & 0x000000ff) << 24);
            *(command + 3) = (points[0] & 0x00ffffff) | (pbv << 30) | (pbh << 31);
            *(command + 4) = width;
            *(command + 5) = host_base_value;
#ifdef DEBUG
            printf ("ym.in:%x ym.sl:%x xm.in:%x wm.sl:%x\n",*(command + 1),*(command + 2),

*(command + 3),*(command + 4));
#endif
    }

/***********************************************************************/
void make_complex_blt(unsigned *command, FIX points[6],
            FIX colors[3], FIX zs[3], FIX alphas[3])
{
        int  i,
                min_pt,
                off_pt,
                max_pt;

FIX  min=0x7fffffff,
                max=0;

int  x_min_main,
                x_min_end,
                x_mid,
                x_max_main,
                x_max_end,
                x_bottom,
``` xslope,
x1slope,
x2slope,
dx, dx1, dx2, y_max,
y_mid,
y_min,
dy, dy1, dy2, z_min_end,
z_min_main,
z_mid,
z_max,
zslope,
z_ortho_slope,
z_error,
zerror_sign,
zortho_sign,
dz, dz1, c_min_end,
c_min_main,
c_mid,
c_max,
cslope,
c_ortho_slope,
c_error,
cerror_sign,
cortho_sign,
dc, dc1, a_min_end,
a_min_main,
a_mid,
a_max,
aslope,
a_ortho_slope,
da, da1, length1,
length2,

```
            width1,
            width2,
            width1_slope,
            width2_slope, flat_bottom_flag,
            flat_top_flag,
            dir;

double
            dy_f, dy1_f, dy2_f, xslope_f, x1slope_f, x2slope_f,
            x_ortho_main_f, x_ortho_end_f,
            dx_ortho_f, zslope_f,
            z1slope_f,
            z_ortho_slope_f,
            z_ortho_main_f,
            z_ortho_end_f,
            dz_f, dz1_f,
            dz_ortho_f, cslope_f,
            c1slope_f,
            c_ortho_slope_f,
            c_ortho_main_f,
            c_ortho_end_f,
            dc_f, dc1_f,
            dc_ortho_f, aslope_f,
            a1slope_f,
            a_ortho_slope_f,
            a_ortho_main_f,
            a_ortho_end_f,
            da_f, da1_f,
            da_ortho_f, dir_f,
            shift_factor= (double) (1L<<FRACBITS),
            alpha_shift_factor= (double) (1L<<ALPHA_FRACBITS),
```

8

```
                dummy;

for(i=1;i<=5;i+=2)
{
        if(points[i] > max)
        {
                max = points[i];
                max_pt = i-1;
        }
        if(points[i] < min)
        {
                min = points[i];
                min_pt = i-1;
        }
}
for(i=0;i<=4;i+=2)
{
        if((max_pt != i) && (min_pt != i))
                off_pt = i;
} flat_bottom_flag = 0;
flat_top_flag = 0;
if(points[min_pt+1] != points[off_pt+1])
        {
        if(points[max_pt+1] != points[off_pt+1])
                {
                /* normal */
                x_max_main = points[max_pt];
                x_max_end  = points[max_pt];
                x_mid      = points[off_pt];
                x_min_main = points[min_pt];
                x_min_end  = points[min_pt];

y_max  = points[max_pt+1];
                y_mid  = points[off_pt+1];
                y_min  = points[min_pt+1];

z_mid     = zs[off_pt>>1];
                z_min_end = zs[min_pt>>1];

c_mid     = colors[off_pt>>1];
                c_min_end = colors[min_pt>>1];
```

```
                a_mid    = alphas[off_pt>>1];
                a_min_end = alphas[min_pt>>1];
                }
        else
                {
                flat_top_flag = 1;

x_max_main = points[max_pt];
                x_max_end  = points[off_pt];
                x_mid      = points[off_pt];
                x_min_main = points[min_pt];
                x_min_end  = points[min_pt];

y_max    = points[max_pt+1];
                y_mid    = points[off_pt+1];
                y_min    = points[min_pt+1];

z_mid     = zs[off_pt>>1];
                z_min_end = zs[min_pt>>1];

c_mid     = colors[off_pt>>1];
                c_min_end = colors[min_pt>>1];

a_mid     = alphas[off_pt>>1];
                a_min_end = alphas[min_pt>>1];
                }
        }
else
        {
        flat_bottom_flag = 1;

x_max_main = points[max_pt];
        x_max_end  = points[max_pt];
        x_mid      = points[max_pt];
        x_min_main = points[min_pt];
        x_min_end  = points[off_pt];

y_max    = points[max_pt+1];
        y_mid    = points[max_pt+1];
        y_min    = points[min_pt+1];

z_mid     = zs[off_pt>>1];
        z_min_end = zs[off_pt>>1];
```

```
        c_mid     = colors[off_pt>>1];
        c_min_end = colors[off_pt>>1];

a_mid     = alphas[off_pt>>1];
        a_min_end = alphas[off_pt>>1];
    } z_max      = zs[max_pt>>1];
    z_min_main = zs[min_pt>>1];

c_max      = colors[max_pt>>1];
    c_min_main = colors[min_pt>>1];

a_max      = alphas[max_pt>>1];
    a_min_main = alphas[min_pt>>1];

x_bottom = x_min_end - x_min_main;

dx  = x_max_main - x_min_main;
    dx1 = x_mid      - x_min_end ;
    dx2 = x_max_end  - x_mid;

dy  = y_max - y_min;
    dy1 = y_mid - y_min;
    dy2 = y_max - y_mid;

dy_f  = (double)dy;
    dy1_f = (double)dy1;
    dy2_f = (double)dy2;

length1 = (dy1 >> FRACBITS);
    length2 = (dy2 >> FRACBITS);

xslope_f  = (dy  == 0) ? 0:(((double)dx )/dy_f );
    x1slope_f = (dy1 == 0) ? 0:(((double)dx1)/dy1_f);
    x2slope_f = (dy2 == 0) ? 0:(((double)dx2)/dy2_f);

xslope  = ((FIX)(xslope_f  * shift_factor));
    x1slope = ((FIX)(x1slope_f * shift_factor));
    x2slope = ((FIX)(x2slope_f * shift_factor));

if (flat_bottom_flag)
```

11

```
        {
                dx_ortho_f = (double)(x_min_end - x_min_main);
        }
        else if (flat_top_flag)
        {
                dx_ortho_f = (double)(x_max_end - x_max_main);
        }
        else
        {
                x_ortho_main_f = ((double)x_min_main) + (xslope_f * dy1_f * dy_f);
                x_ortho_end_f  = ((double)x_min_end ) + (x1slope_f * dy_f * dy1_f);
                dx_ortho_f     = x_ortho_end_f - x_ortho_main_f;
        } if(dx_ortho_f > 0.0)
                {
                dir_f = 1.0;
                dir   = 1;
                }
        else
                {
                dir_f = -1.0;
                dir   = -1;
                } width1_slope =      dir * (x1slope - xslope);
        width2_slope =      dir * (x2slope - xslope);

width1 = ABS(x_bottom) + 0x1000;
        /*width2 = width1 + ABS((width1_slope * length1));*/
        width2 = ABS((width1_slope * length1));

*(command + 3) = x_min_main;         /* xmain */
        *(command + 4) = 0;                  /* xslope */

*(command + 1) = y_min | (((FIX) length1 >>8) << 24);   /* ymain */
        *(command + 2) = ONESLOPE | (((FIX) length1) << 24);    /* yslope */

*(command + 9) = width2;             /* w1main */

*(command + 10) = 0;                                    /* w1slope */
        *(command + 10) = MASK (24, *(command + 10));
```

```
if( dir < 0 )
        *(command + 3) |= DIRBIT;
else
        *(command + 3) &= 0x7fffffff;

*(command + 11) = width2;                    /* w2main */
*(command + 11) = MASK(24, *(command + 11)) | ((length2>>8)<<24);

*(command + 12) = 0;                         /* w2slope */
*(command + 12) = MASK(24, *(command + 12)) | (length2<<24);

dz      = z_max - z_min_main;
dz1 = z_mid - z_min_end;
dz_f  = (double)dz;
dz1_f = (double)dz1;
zslope_f = (dy  == 0) ? 0:dz_f /dy_f;
z1slope_f = (dy1 == 0) ? 0:dz1_f/dy1_f;
zslope   = (FIX)(zslope_f * shift_factor);
if (flat_bottom_flag)
{
        dz_ortho_f = (double)(z_min_end - z_min_main);
}
else if (flat_top_flag)
{
        dz_ortho_f = (double)(z_mid - z_max);
}
else
{
        z_ortho_main_f = ((float)z_min_main) + (zslope_f * dy1_f * dy_f);
        z_ortho_end_f  = ((float)z_min_end ) + (z1slope_f * dy_f * dy1_f);
        dz_ortho_f     = z_ortho_end_f - z_ortho_main_f;
}
z_ortho_slope_f = dir_f*(dz_ortho_f/dx_ortho_f);
z_ortho_slope = (FIX)(z_ortho_slope_f * shift_factor);
z_error = (FIX)(-dir_f * z_ortho_slope_f * modf(xslope_f,&dummy) * shift_factor);
*(command + 5) = z_min_main;
*(command + 6) = zslope;
*(command + 14) = z_ortho_slope;
zerror_sign = (z_error & 0x00800000) ? 1 : 0;
zortho_sign = (z_ortho_slope & 0x00800000) ? 1 : 0;
if (zerror_sign ^ zortho_sign)
{
        if ((z_min_main + z_ortho_slope) & 0x10000000)
```

```
                        *(command + 13) = 0;
                else
                        *(command + 13) = z_error;
        }
        else
        {
                if ((z_min_main - z_ortho_slope) & 0x10000000)
                        *(command + 13) = 0;
                else
                        *(command + 13) = z_error;
        } dc      = c_max - c_min_main;
        dc1 = c_mid - c_min_end;
        dc_f    = (double)dc;
        dc1_f = (double)dc1;
        cslope_f = (dy  == 0) ? 0:dc_f /dy_f;
        c1slope_f = (dy1 == 0) ? 0:dc1_f/dy1_f;
        cslope  = (FIX)(cslope_f * shift_factor);
        if (flat_bottom_flag)
        {
                dc_ortho_f = (double)(c_min_end - c_min_main);
        }
        else if (flat_top_flag)
        {
                dc_ortho_f = (double)(c_mid - c_max);
        }
        else
        {
                c_ortho_main_f = ((float)c_min_main) + (cslope_f * dy1_f * dy_f);
                c_ortho_end_f = ((float)c_min_end ) + (c1slope_f * dy_f * dy1_f);
                dc_ortho_f      = c_ortho_end_f - c_ortho_main_f;
        }
        c_ortho_slope_f = dir_f*(dc_ortho_f/dx_ortho_f);
        c_ortho_slope = (FIX)(c_ortho_slope_f * shift_factor);
        c_error = (FIX)(-dir_f * c_ortho_slope_f * modf(xslope_f,&dummy) * shift_factor);
        *(command + 7) = c_min_main;
        *(command + 8) = cslope;
        *(command + 16) = c_ortho_slope;
        cerror_sign = (c_error & 0x00800000) ? 1 : 0;
        cortho_sign = (c_ortho_slope & 0x00800000) ? 1 : 0;

/*
```

```
              c_ortho_slope_f = (((float) c_error) / ((float) xslope)) * -dir_f;
              *(command + 16) = (FIX) (c_ortho_slope_f * shift_factor);
*/ if (cerror_sign ^ cortho_sign)
              {
                     if ((c_min_main + c_ortho_slope) & 0x00100000)
                            *(command + 15) = 0;
                     else
                            *(command + 15) = c_error;
              }
              else
              {
                     if ((c_min_main - c_ortho_slope) & 0x00100000)
                            *(command + 15) = 0;
                     else
                            *(command + 15) = c_error;
              } da       = a_max - a_min_main;
              da1      = a_mid - a_min_end;
              da_f     = (double)da;
              da1_f    = (double)da1;
              aslope_f = (dy  == 0) ? 0:da_f/dy_f;
              a1slope_f= (dy1 == 0) ? 0:da1_f/dy1_f;
              aslope   = (FIX)(aslope_f * alpha_shift_factor);
              if (flat_bottom_flag)
              {
                     da_ortho_f = (double)(a_min_end - a_min_main);
              }
              else if (flat_top_flag)
              {
                     da_ortho_f = (double)(a_mid - a_max);
              }
              else
              {
                     a_ortho_main_f = ((float)a_min_main) + (aslope_f * dy1_f * dy_f);
                     a_ortho_end_f  = ((float)a_min_end ) + (a1slope_f * dy_f * dy1_f);
                     da_ortho_f     = a_ortho_end_f - a_ortho_main_f;
              } a_ortho_slope_f = dir_f*(da_ortho_f/dx_ortho_f);
              a_ortho_slope   = (FIX)(a_ortho_slope_f * alpha_shift_factor);
```

15

```
        a_min_main = a_min_main >> 4;
        *(command + 18) = (a_min_main << 16) | (aslope & 0x0000ffff);
        *(command + 17) = a_ortho_slope;

*(command + 13) = 0;
        *(command + 15) = 0;

#ifdef DEBUG
        printf ("\nmax_x:%x max_y:%x max_c:%x max_z:%x max_a:%x\n", points[max_pt],points[max_pt+1],colors[max_pt>>1],zs[max_pt>>1],alphas[max_pt>>1]);
        printf ("off_x:%x off_y:%x off_c:%x off_z:%x off_a:%x\n", points[off_pt],points[off_pt+1],colors[off_pt>>1],zs[off_pt>>1],alphas[off_pt>>1]);
        printf ("min_x:%x min_y:%x min_c:%x min_z:%x min_a:%x\n", points[min_pt],points[min_pt+1],colors[min_pt>>1],zs[min_pt>>1],alphas[min_pt>>1]);
        printf ("x_ortho_end_f:%f x_ortho_main_f:%f\n",x_ortho_end_f,x_ortho_main_f);
        printf ("dx_ortho_f:%f\n",dx_ortho_f);
        printf ("dc_f:%f dc1_f:%f \ndy_f:%f dy1_f:%f\n",dc_f,dc1_f,dy_f,dy1_f);
        printf ("c_ortho_slope_f:%f\n",c_ortho_slope);
        printf ("c_ortho_end_f:%f c_ortho_main_f:%f\n",c_ortho_end_f,c_ortho_main_f);
#endif
    /* print_status(command); */
}

/*****************************************************************************/
void make_poly(unsigned *command, FIX points[6], FIX colors[3],
        FIX zs[3], FIX alphas[3])
{
        int   i,
                min_pt,
                off_pt,
                max_pt;

FIX   min=0x7fffffff,
                max=0;

int   x_min_main,
                x_min_end,
                x_mid,
                x_max_main,
                x_max_end,
``` x_bottom,
xslope,
x1slope,
x2slope,
dx, dx1, dx2, y_max,
y_mid,
y_min,
dy, dy1, dy2, z_min_end,
z_min_main,
z_mid,
z_max,
zslope,
z_ortho_slope,
z_error,
zerror_sign,
zortho_sign,
dz, dz1, c_min_end,
c_min_main,
c_mid,
c_max,
cslope,
c_ortho_slope,
c_error,
cerror_sign,
cortho_sign,
dc, dc1, a_min_end,
a_min_main,
a_mid,
a_max,
aslope,
a_ortho_slope,
da, da1, length1,
length2,

17

```
                    width1,
                    width2,
                    width1_slope,
                    width2_slope, flat_bottom_flag,
                    flat_top_flag,
                    dir;

double
                    dy_f, dy1_f, dy2_f, xslope_f, x1slope_f, x2slope_f,
                    x_ortho_main_f, x_ortho_end_f,
                    dx_ortho_f, zslope_f,
                    z1slope_f,
                    z_ortho_slope_f,
                    z_ortho_main_f,
                    z_ortho_end_f,
                    dz_f, dz1_f,
                    dz_ortho_f, cslope_f,
                    c1slope_f,
                    c_ortho_slope_f,
                    c_ortho_main_f,
                    c_ortho_end_f,
                    dc_f, dc1_f,
                    dc_ortho_f, aslope_f,
                    a1slope_f,
                    a_ortho_slope_f,
                    a_ortho_main_f,
                    a_ortho_end_f,
                    da_f, da1_f,
                    da_ortho_f, dir_f,
                    shift_factor= (double) (1L<<FRACBITS),
                    alpha_shift_factor= (double) (1L<<ALPHA_FRACBITS),
```

```
                dummy;

for(i=1;i<=5;i+=2)
        {
                if(points[i] > max)
                {
                        max = points[i];
                        max_pt = i-1;
                }
                if(points[i] < min)
                {
                        min = points[i];
                        min_pt = i-1;
                }
        }
        for(i=0;i<=4;i+=2)
        {
                if((max_pt != i) && (min_pt != i))
                        off_pt = i;
        } flat_bottom_flag = 0;
        flat_top_flag = 0;
        if(points[min_pt+1] != points[off_pt+1])
                {
                if(points[max_pt+1] != points[off_pt+1])
                        {
                        /* normal */
                        x_max_main = points[max_pt];
                        x_max_end  = points[max_pt];
                        x_mid      = points[off_pt];
                        x_min_main = points[min_pt];
                        x_min_end  = points[min_pt];

y_max   = points[max_pt+1];
                        y_mid   = points[off_pt+1];
                        y_min   = points[min_pt+1];

z_mid     = zs[off_pt>>1];
                        z_min_end = zs[min_pt>>1];

c_mid     = colors[off_pt>>1];
                        c_min_end = colors[min_pt>>1];
```

19

```
                a_mid     = alphas[off_pt>>1];
                a_min_end = alphas[min_pt>>1];
                }
        else
                {
                flat_top_flag = 1;

x_max_main = points[max_pt];
                x_max_end  = points[off_pt];
                x_mid      = points[off_pt];
                x_min_main = points[min_pt];
                x_min_end  = points[min_pt];

y_max  = points[max_pt+1];
                y_mid  = points[off_pt+1];
                y_min  = points[min_pt+1];

z_mid     = zs[off_pt>>1];
                z_min_end = zs[min_pt>>1];

c_mid     = colors[off_pt>>1];
                c_min_end = colors[min_pt>>1];

a_mid     = alphas[off_pt>>1];
                a_min_end = alphas[min_pt>>1];
                }
        }
else
        {
        flat_bottom_flag = 1;

x_max_main = points[max_pt];
        x_max_end  = points[max_pt];
        x_mid      = points[max_pt];
        x_min_main = points[min_pt];
        x_min_end  = points[off_pt];

y_max  = points[max_pt+1];
        y_mid  = points[max_pt+1];
        y_min  = points[min_pt+1];

z_mid     = zs[off_pt>>1];
        z_min_end = zs[off_pt>>1];
```

```
        c_mid     = colors[off_pt>>1];
        c_min_end = colors[off_pt>>1];

a_mid     = alphas[off_pt>>1];
        a_min_end = alphas[off_pt>>1];
    } z_max      = zs[max_pt>>1];
    z_min_main = zs[min_pt>>1];

c_max      = colors[max_pt>>1];
    c_min_main = colors[min_pt>>1];

a_max      = alphas[max_pt>>1];
    a_min_main = alphas[min_pt>>1];

x_bottom = x_min_end - x_min_main;

dx  = x_max_main - x_min_main;
    dx1 = x_mid      - x_min_end ;
    dx2 = x_max_end  - x_mid;

dy  = y_max - y_min;
    dy1 = y_mid - y_min;
    dy2 = y_max - y_mid;

dy_f  = (double)dy;
    dy1_f = (double)dy1;
    dy2_f = (double)dy2;

length1 = (dy1 >> FRACBITS);
    length2 = (dy2 >> FRACBITS);

xslope_f  = (dy  == 0) ? 0:(((double)dx )/dy_f );
    x1slope_f = (dy1 == 0) ? 0:(((double)dx1)/dy1_f);
    x2slope_f = (dy2 == 0) ? 0:(((double)dx2)/dy2_f);

xslope  = ((FIX)(xslope_f  * shift_factor));
    x1slope = ((FIX)(x1slope_f * shift_factor));
    x2slope = ((FIX)(x2slope_f * shift_factor));

if (flat_bottom_flag)
```

21

```
        {
                dx_ortho_f = (double)(x_min_end - x_min_main);
        }
        else if (flat_top_flag)
        {
                dx_ortho_f = (double)(x_max_end - x_max_main);
        }
        else
        {
                x_ortho_main_f = ((double)x_min_main) + (xslope_f * dy1_f * dy_f);
                x_ortho_end_f  = ((double)x_min_end ) + (x1slope_f * dy_f * dy1_f);
                dx_ortho_f     = x_ortho_end_f - x_ortho_main_f;
        } if(dx_ortho_f > 0.0)
                {
                dir_f = 1.0;
                dir   = 1;
                }
        else
                {
                dir_f = -1.0;
                dir   = -1;
                } width1_slope =    dir * (x1slope - xslope);
        width2_slope =    dir * (x2slope - xslope);

width1 = ABS(x_bottom) + 0x1000;
        width2 = width1 + ABS((width1_slope * length1));
        width2 += width2_slope;

*(command + 3) = x_min_main;        /* xmain */
        *(command + 4) = xslope;            /* xslope */

*(command + 1) = y_min | (((FIX) length1 >>8) << 24);   /* ymain */
        *(command + 2) = ONESLOPE | (((FIX) length1) << 24);.   /* yslope */

*(command + 9) = width1;            /* w1main */

*(command + 10) = (FIX)width1_slope;   /* w1slope */
        *(command + 10) = MASK (24, *(command + 10));
```

22

```
        if( dir < 0 )
                *(command + 3) |= DIRBIT;
        else
                *(command + 3) &= 0x7fffffff;

*(command + 11) = width2;               /* w2main */
        *(command + 11) = MASK(24, *(command + 11)) | ((length2>>8)<<24);

*(command + 12) = (FIX)width2_slope;    /* w2slope */
        *(command + 12) = MASK(24, *(command + 12)) | (length2<<24);

dz      = z_max - z_min_main;
        dz1 = z_mid - z_min_end;
        dz_f  = (double)dz;
        dz1_f = (double)dz1;
        zslope_f = (dy == 0) ? 0:dz_f/dy_f;
        z1slope_f = (dy1 == 0) ? 0:dz1_f/dy1_f;
        zslope = (FIX)(zslope_f * shift_factor);
        if (flat_bottom_flag)
        {
                dz_ortho_f = (double)(z_min_end - z_min_main);
        }
        else if (flat_top_flag)
        {
                dz_ortho_f = (double)(z_mid - z_max);
        }
        else
        {
                z_ortho_main_f = ((float)z_min_main) + (zslope_f * dy1_f * dy_f);
                z_ortho_end_f  = ((float)z_min_end ) + (z1slope_f * dy_f * dy1_f);
                dz_ortho_f     = z_ortho_end_f - z_ortho_main_f;
        }
        z_ortho_slope_f = dir_f*(dz_ortho_f/dx_ortho_f);
        z_ortho_slope = (FIX)(z_ortho_slope_f * shift_factor);
        z_error = (FIX)(-dir_f * z_ortho_slope_f * modf(xslope_f,&dummy) * shift_factor);
        *(command + 5) = z_min_main;
        *(command + 6) = zslope;
        *(command + 14) = z_ortho_slope;
        zerror_sign = (z_error & 0x00800000) ? 1 : 0;
        zortho_sign = (z_ortho_slope & 0x00800000) ? 1 : 0;
#ifdef PARANOIA
        if (zerror_sign ^ zortho_sign)
        {
```

23

```
                    if ((z_min_main + z_ortho_slope) & 0x10000000)
                            *(command + 13) = 0;
                    else
                            *(command + 13) = z_error;
            }
            else
            {
                    if ((z_min_main - z_ortho_slope) & 0x10000000)
                            *(command + 13) = 0;
                    else
                            *(command + 13) = z_error;
            }
else
            *(command + 13) = z_error;
endif dc      = c_max - c_min_main;
            dc1     = c_mid - c_min_end;
            dc_f    = (double)dc;
            dc1_f   = (double)dc1;
            cslope_f  = (dy  == 0) ? 0:dc_f/dy_f;
            c1slope_f = (dy1 == 0) ? 0:dc1_f/dy1_f;
            cslope  = (FIX)(cslope_f * shift_factor);
            if (flat_bottom_flag)
            {
                    dc_ortho_f = (double)(c_min_end - c_min_main);
            }
            else if (flat_top_flag)
            {
                    dc_ortho_f = (double)(c_mid - c_max);
            }
            else
            {
                    c_ortho_main_f = ((float)c_min_main) + (cslope_f * dy1_f * dy_f);
                    c_ortho_end_f  = ((float)c_min_end ) + (c1slope_f * dy_f * dy1_f);
                    dc_ortho_f     = c_ortho_end_f - c_ortho_main_f;
            }
            c_ortho_slope_f = dir_f*(dc_ortho_f/dx_ortho_f);
            c_ortho_slope = (FIX)(c_ortho_slope_f * shift_factor);
            c_error = (FIX)(-dir_f * c_ortho_slope_f * modf(xslope_f,&dummy) * shift_factor);
            *(command + 7) = c_min_main;
            *(command + 8) = cslope;
            *(command + 16) = c_ortho_slope;
```

```
                cerror_sign =  (c_error & 0x00800000) ? 1 : 0;
                cortho_sign =  (c_ortho_slope & 0x00800000) ? 1 : 0;

/*
                c_ortho_slope_f = (((float) c_error) / ((float) xslope)) * -dir_f;
                *(command + 16) = (FIX) (c_ortho_slope_f * shift_factor);
*/ ifdef PARANOIA
                if (cerror_sign ^ cortho_sign)
                {
                        if ((c_min_main + c_ortho_slope) & 0x00100000)
                                *(command + 15) = 0;
                        else
                                *(command + 15) = c_error;
                }
                else
                {
                        if ((c_min_main - c_ortho_slope) & 0x00100000)
                                *(command + 15) = 0;
                        else
                                *(command + 15) = c_error;
                }
else
                *(command + 15) = c_error;
endif da      = a_max - a_min_main;
                da1 = a_mid - a_min_end;
                da_f  = (double)da;
                da1_f = (double)da1;
                aslope_f  = (dy  == 0) ? 0:da_f /dy_f;
                a1slope_f = (dy1 == 0) ? 0:da1_f/dy1_f;
                aslope  = (FIX)(aslope_f * alpha_shift_factor);
                if (flat_bottom_flag)
                {
                        da_ortho_f = (double)(a_min_end - a_min_main);
                }
                else if (flat_top_flag)
                {
                        da_ortho_f = (double)(a_mid - a_max);
                }
                else
```

```
        {
                a_ortho_main_f = ((float)a_min_main) + (aslope_f * dy1_f * dy_f);
                a_ortho_end_f  = ((float)a_min_end ) + (alslope_f * dy_f * dy1_f);
                da_ortho_f     = a_ortho_end_f - a_ortho_main_f;
        } a_ortho_slope_f = dir_f*(da_ortho_f/dx_ortho_f);
        a_ortho_slope = (FIX)(a_ortho_slope_f * alpha_shift_factor);
        a_min_main = a_min_main >> 4;
        *(command + 18) = (a_min_main << 16) | (aslope & 0x0000ffff);
        *(command + 17) = a_ortho_slope;

#ifdef NO_ERROR_CRR
        *(command + 13) = 0;
        *(command + 15) = 0;
endif ifdef DEBUG
        printf ("\nmax_x:%x max_y:%x max_c:%x max_z:%x max_a:%x\n", points[max_pt],points[max_pt+1],colors[max_pt>>1],zs[max_pt>>1],alphas[max_pt>>1]);
        printf ("off_x:%x off_y:%x off_c:%x off_z:%x off_a:%x\n", points[off_pt],points[off_pt+1],colors[off_pt>>1],zs[off_pt>>1],alphas[off_pt>>1]);
        printf ("min_x:%x min_y:%x min_c:%x min_z:%x min_a:%x\n", points[min_pt],points[min_pt+1],colors[min_pt>>1],zs[min_pt>>1],alphas[min_pt>>1]);
        printf ("x_ortho_end_f:%f x_ortho_main_f:%f\n",x_ortho_end_f,x_ortho_main_f);
        printf ("dx_ortho_f:%f\n",dx_ortho_f);
        printf ("dc_f:%f dc1_f:%f \ndy_f:%f dy1_f:%f\n",dc_f,dc1_f,dy_f,dy1_f);
        printf ("c_ortho_slope_f:%f\n",c_ortho_slope);
        printf ("c_ortho_end_f:%f c_ortho_main_f:%f\n",c_ortho_end_f,c_ortho_main_f);
#endif
  /* print_status(command); */
}

/****************************************************************************/
void make_vector(unsigned *command, FIX points[6],
                FIX colors[3], FIX zs[3])
{
        int dx,dy,abs_dx,abs_dy;
        FIX abs_slope;
        int main_length;
```

```
        int temp;
        double shift_factor= (double) (1L<<FRACBITS);

*(command + 3) = points[0];
        *(command + 1) = points[1];
        *(command + 7) = colors[0];
        *(command + 5) = zs[0];
        dx = points[2] - points[0];
        dy = points[3] - points[1];
        if((dx == 0L) && (dy == 0L))
        {
                *(command + 2) = 0;
                *(command + 4) = 0;
                *(command + 8) = 0;
                *(command + 6) = 0;
                /*print_status (command);*/
                return;
        }
        abs_dx = ((dx < 0) ? -dx : dx);
        abs_dy = ((dy < 0) ? -dy : dy);
#ifdef DEBUG
        printf ("dx:%x dy:%x abs_dx:%x abs_dy:%x\n",dx,dy,abs_dx,abs_dy);
#endif
        if(abs_dx < abs_dy)
        {
                main_length = abs_dy>>FRACBITS;

*(command + 2) = ((dy < 0) ? NEG_ONESLOPE : ONESLOPE);
                abs_slope = INTGMASK & ((FIX)(shift_factor * (double)abs_dx
                                                        / (double)abs_dy));
                *(command + 4) = INTGMASK & ((dx < 0) ? -abs_slope : abs_slope);
                if( dx  < 0 )
                        *(command + 3) |= DIRBIT;
                else
                        *(command + 3) &= 0x7fffffff;
        }
        else
        {
                main_length = abs_dx>>FRACBITS;

*(command + 4) = ((dx < 0) ? NEG_ONESLOPE : ONESLOPE);
                abs_slope = INTGMASK & ((FIX)(shift_factor * ((double)abs_dy
                                                        /    (double)abs_dx)));
```

```
                *(command + 2) = INTGMASK & ((dy < 0) ? -abs_slope : abs_slope);
                if( dx < 0 )
                        *(command + 3) |= DIRBIT;
                else
                        *(command + 3) &= 0x7fffffff;
        }
        *(command + 2) |= (MASK(8,main_length))<<WORDBITS;
        *(command + 1) |= (main_length>>8)<<WORDBITS;
        temp = (int)((int)(colors[1] - colors[0])/main_length);
        *(command + 8) = (FIX)temp;
        temp = (int)((int)(zs[1] - zs[0])/main_length);
        *(command + 6) = (FIX)temp;
        /*print_status (command);*/
        return;
}

/************************************************************************/
void make_poly_vector(unsigned *command, FIX points[4])
{
        int dx,dy,abs_dx,abs_dy;
        FIX abs_slope;
        int main_length;
        double shift_factor= (double) (1L<<FRACBITS);

dx = points[2] - points[0];
        dy = points[3] - points[1];
        if((dx == 0L) && (dy == 0L))
        {
                *(command + 0) = 0;
                *(command + 1) = 0;
                return;
        }
        abs_dx = ((dx < 0) ? -dx : dx);
        abs_dy = ((dy < 0) ? -dy : dy);
#ifdef DEBUG
        printf ("dx:%x dy:%x abs_dx:%x abs_dy:%x\n",dx,dy,abs_dx,abs_dy);
#endif
        if(abs_dx < abs_dy)
        {
                main_length = abs_dy>>FRACBITS;

*(command + 1) = ((dy < 0) ? NEG_ONESLOPE : ONESLOPE);
                abs_slope = INTGMASK & ((FIX)(shift_factor * (double)abs_dx
```

```
                                                        / (double)abs_dy));
            *(command + 0) = INTGMASK & ((dx < 0) ? -abs_slope : abs_slope);
    }
    else
    {
            main_length = abs_dx>>FRACBITS;

*(command + 0) = ((dx < 0) ? NEG_ONESLOPE : ONESLOPE);
            abs_slope = INTGMASK & ((FIX)(shift_factor * ((double)abs_dy
                                                        / (double)abs_dx)));
            *(command + 1) = INTGMASK & ((dy < 0) ? -abs_slope : abs_slope);
    }
    main_length -= 2;
    *(command + 1) |= (MASK(8,main_length))<<WORDBITS;
    *(command + 0) |= (main_length>>8)<<WORDBITS;
    /*print_status (command);*/
    return;
}

/**********************************************************************/
void print_status (unsigned *command)
{ printf ("xm.in:%x xm.sl:%x ym.in:%x ym.sl:%x\n",*(command + 3),*(command + 4),

*(command + 1),*(command + 2));
    printf ("zm.in:%x zm.sl:%x cm.in:%x cm.sl:%x\n",*(command + 5),*(command + 6),

*(command + 7),*(command + 8));
    printf ("w1.in:%x w1.sl:%x w2.in:%x w2.sl:%x\n",*(command + 9),*(command + 10),

*(command + 11),*(command + 12));
    printf ("zerr:%x zortho:%x cerr:%x cortho:%x\n",*(command + 13),*(command + 14),

*(command + 15),*(command + 16));
    printf ("al.or:%x al.in_sl:%x\n",*(command + 17), *(command + 18));

}
```

I claim:

1. A method of correcting errors of at least one variable characteristic of a polygon while interpolating the polygon into a pixel grid, wherein the pixel grid includes reference and orthogonal dimensions and corresponding coordinates defining pixel boundaries and wherein the polygon is interpolated with orthogonal span lines of pixels each beginning at an initial pixel along a main slope of the polygon, comprising the steps of:

calculating an error value for a variable characteristic based on an orthogonal component of the main slope and an orthogonal slope value of the variable characteristic;

incorporating the calculated error value into the variable characteristic of each initial pixel of the orthogonal scan lines in the numerically opposite direction as the characteristic orthogonal slope value of the variable characteristic;

indicating when the main slope crosses a pixel grid boundary while interpolating to a next orthogonal scan line due to an overflow of a fractional portion of the orthogonal component of the main slope; and adding the orthogonal slope value of the variable characteristic to the variable characteristic of an initial pixel of the orthogonal scan line when fractional overflow is indicated.

2. The method of claim 1, wherein a variable characteristic of the polygon is pixel intensity.

3. The method of claim 1, wherein a variable characteristic of the polygon is depth, wherein depth values are included to simulate a depth dimension.

4. The method of claim 1, wherein a variable characteristic of the polygon is transparency in the form of alpha blending values.

5. The method of claim 1, wherein said step of calculating an error value comprises the steps of:

receiving vertices of the polygon;

determining a main slope spanning the reference dimension of the polygon between two of the polygon vertices;

calculating an orthogonal component of the main slope;

calculating an orthogonal slope value of the variable characteristic; and multiplying a fractional portion of the orthogonal component of the main slope by the orthogonal slope value of the variable characteristic.

6. The method of claim 1, wherein said step of incorporating the calculated error value comprises the steps of:

accumulating the error value resulting in an accumulated error value having a numeric sign being the negative of the numeric sign of the orthogonal slope value of the variable characteristic; and adding the accumulated error value to the variable characteristic of initial pixels of each orthogonal scan line.

7. The method of claim 6, wherein said step of adding the orthogonal slope value of the variable characteristic to the variable characteristic reduces the magnitude of the accumulated error value.

8. The method of claim 1, wherein said step of indicating when the main slope crosses a pixel grid boundary comprises the steps of:

interpolating the orthogonal component by adding an integer orthogonal slope value to an integer component and adding a fractional orthogonal slope value to a fractional component;

providing an overflow value from the fractional portion to the integer portion; and indicating when the overflow value is provided.

9. The method of claim 8, wherein the fractional overflow is based on the overflow value and the numeric sign of the integer portion.

10. A method of correcting errors in pixel characteristics when interpolating a coplanar polygon into a pixel grid having a reference dimension and an orthogonal dimension and corresponding coordinates, the polygon being interpolated with orthogonal scan lines of pixels from a main slope of the polygon, comprising the steps of:

receiving an initial characteristic value of a base point at one end of the main slope, a main slope characteristic slope value, a characteristic orthogonal slope value and a characteristic error value;

accumulating an orthogonal coordinate beginning with an initial orthogonal coordinate of the base point and adding an orthogonal component of the main slope;

accumulating a main slope characteristic value by starting with the initial characteristic value and adding the main slope characteristic slope value for each pixel along the main slope;

accumulating an error value by adding characteristic error values for each pixel along the main slope;

adding the accumulated error value to the main slope characteristic value for each pixel along the main slope;

indicating a fractional overflow when a fractional portion of the orthogonal coordinate overflows to an integer portion; and adding the characteristic orthogonal slope value to reduce the magnitude of the accumulated error value when fractional overflow is indicated.

11. The method of claim 10, wherein the pixel characteristic is pixel intensity.

12. The method of claim 10, wherein the pixel characteristic is pixel transparency.

13. The method of claim 10, wherein the pixel grid further includes a depth dimension and corresponding depth values, wherein the pixel characteristic is depth.

14. The method of claim 10, before said receiving step, further comprising the steps of:

calculating the main slope characteristic slope value based on the change of the characteristic along the main slope;

calculating the characteristic orthogonal slope value based on the change of the characteristic per pixel in the orthogonal direction; and calculating the characteristic error value based on an orthogonal component of the main slope and the characteristic orthogonal slope value.

15. The method of claim 10, wherein during said step of accumulating an error value, the accumulated error value is accumulated in the opposite direction as the characteristic orthogonal slope value.

16. The method of claim 10, wherein said step of accumulating an orthogonal coordinate comprises the steps of:

adding an integer orthogonal slope value to the integer portion; and adding a fractional orthogonal slope value to the fractional portion.

17. The method of claim 16, further comprising the steps of providing an overflow value from the fractional portion to the integer portion, wherein said step of indicating a fractional overflow occurs when the overflow value is provided.

18. An apparatus for incrementally correcting errors of at least one variable characteristic of a polygon while interpolating the polygon into a pixel grid, wherein the pixel grid includes reference and orthogonal dimensions and corresponding coordinates and wherein the polygon is interpolated with orthogonal span lines of pixels each beginning at an initial pixel along a main slope of the polygon, comprising:

means for calculating an initial orthogonal value, an orthogonal component of the main slope, an initial characteristic value of a characteristic, a characteristic orthogonal slope value of said characteristic and a characteristic error value based on said orthogonal component of the main slope and said characteristic orthogonal slope value;

an interpolator receiving said initial orthogonal value and said orthogonal component of the main slope for providing orthogonal coordinates of the initial pixels along the main slope;

a comparator circuit coupled to said interpolator for indicating a fractional overflow of an orthogonal coordinate; and an accumulator circuit coupled to said comparator circuit and receiving said characteristic error value and said characteristic orthogonal slope value for incorporating said characteristic error value into characteristic values of the initial pixels along the main slope in a numerically opposite direction as said characteristic orthogonal slope value, said accumulator circuit further adding said characteristic orthogonal slope value to one of said characteristic values when said comparator circuit indicates fractional overflow.

19. The apparatus of claim 18, wherein said calculating means comprises a central processing unit executing a software driver routine.

20. The apparatus of claim 18, wherein said accumulator circuit comprises:

memory for storing said characteristic error value and said characteristic orthogonal slope value;

a register; and an adder circuit coupled to said memory, said register and said comparator circuit, wherein said adder circuit adds the magnitude of said characteristic error value to the contents of said register for each orthogonal scan line while said fractional overflow is not indicated so that said register holds and accumulated error value having a numeric sign opposite the numeric sign of said characteristic orthogonal slope value, and wherein said adder circuit adds said characteristic orthogonal slope value to said accumulated error value when said fractional overflow is indicated.

21. The apparatus of claim 20, wherein said adder circuit comprises:

an arithmetic logic unit having a first data input coupled to the output of said register, a second data input, an output provided to said register and an input for receiving a function select signal, wherein said arithmetic logic unit either adds data provided to said second data input to said accumulated error value, or otherwise subtracts said data from said accumulated error value depending upon said function select signal; and a select circuit coupled to said memory, said arithmetic logic unit and said comparator circuit, for providing either said characteristic orthogonal slope value when said fractional overflow is indicated, or else providing said characteristic error value to said second input of said arithmetic logic unit when said fractional overflow is not indicated, and for asserting said function select signal to indicate an add function when said fractional overflow is indicated or if the numeric signs of said characteristic orthogonal slope value and said characteristic error value are opposite, but otherwise providing said function select signal to indicate a subtract function.

22. The apparatus of claim 20, wherein said accumulator circuit further comprises an adder coupled to an output of said register for adding said accumulated error value to said characteristic values of the initial pixels along the main slope.

23. The apparatus of claim 18, wherein said interpolator comprises:

a first register for receiving said orthogonal component of the main slope;

a second register for receiving said initial orthogonal value; and an adder circuit coupled to said first and second registers for adding the contents of said first and second registers and providing the sum back into said second register.

24. The apparatus of claim 23, wherein said first and second registers each have fractional and integer portions, wherein said adder circuit comprises:

a first adder for adding said fractional portions of said first and second registers and providing a carry output signal; and a second adder receiving said carry input signal for adding said integer portions of said first and second registers and the value of said carry output signal.

25. The apparatus of claim 24, wherein said comparator circuit compares a sign bit of said integer portion of said first register to said carry output signal, and provides a fractional overflow signal indicative thereof.

26. The apparatus of claim 18, wherein said variable characteristic is color intensity.

27. The apparatus of claim 18, wherein said variable characteristic is depth, wherein depth values are included to simulate a third dimension.

28. The apparatus of claim 18, wherein said variable characteristic is transparency in the form of alpha blending values.

29. The apparatus of claim 18, wherein the polygon has at least two variable characteristics including depth and color intensity, further comprising:

said calculating means calculating an initial depth value and an initial intensity value, a depth slope value and an intensity slope value, a depth error value based on said orthogonal component of the main slope and said depth orthogonal slope value and an intensity error value based on said orthogonal component of the main slope and said intensity orthogonal slope value;

wherein said accumulator circuit receives said depth error value and said depth orthogonal slope value for incorporating said depth error value into depth values of the initial pixels along the main slope in a numerically opposite direction as said depth orthogonal slope value, said accumulator circuit further adding said depth orthogonal slope value to one of said depth values when said comparator circuit indicates fractional overflow; and a second accumulator circuit receiving said intensity error value and said intensity orthogonal slope value for incorporating said intensity error value into intensity values of the initial pixels along the main slope in a numerically opposite direction as said intensity orthogonal slope value, said second accumulator circuit further adding said intensity orthogonal slope value to one of said intensity values when said comparator circuit indicates factional overflow.

30. An apparatus for interpolating a coplanar polygon into a pixel grid, the pixel grid having reference and orthogonal coordinates for locating each pixel in the pixel grid and further including memory for storing characteristic values for at least one characteristic of the polygon, and wherein the polygon is interpolated with orthogonal rows of pixels from a main side of the polygon, comprising:

means for calculating initial and incremental values for the reference and orthogonal coordinates and at least one characteristic of the polygon and for calculating a count value indicative of the number of orthogonal rows of pixels for the polygon, said incremental values including an orthogonal coordinate slope value representing the slope of the main side of the polygon in the orthogonal direction and an orthogonal characteristic slope value representing the change of the characteristic between orthogonally adjacent pixels, said calculating means further for calculating a characteristic error value based on said orthogonal coordinate slope value and said orthogonal characteristic slope value;

a reference interpolator for providing a reference coordinate for each of the orthogonal row of pixels based on initial and incremental reference coordinate values;

an orthogonal interpolator for providing an orthogonal coordinate for an initial pixel of each orthogonal row of pixels based on said orthogonal coordinate slope value, said orthogonal interpolator including integer and fractional portions;

an overflow circuit coupled to said orthogonal interpolator for determining when said fractional portion of said orthogonal interpolator overflows into said integer portion, and for providing an overflow signal indicative thereof;

a width interpolator for providing a width value based on initial and incremental orthogonal width values;

a characteristic interpolator for providing a characteristic value for each said initial pixel of the orthogonal rows of pixels along the main side of the polygon based on an initial characteristic value and a main side characteristic slope value; and an error interpolator coupled to said characteristic interpolator, said overflow circuit and receiving said characteristic error value for accumulating said characteristic error value and for adding said accumulated error value to said characteristic value of each said initial pixel, and wherein said error interpolator further receives and adds said orthogonal characteristic slope value to reduce the magnitude of said accumulated error value when said overflow signal is provided.

31. The apparatus of claim 30, wherein said calculating means comprises a central processing unit executing a software driver routine.

32. The apparatus of claim 30, wherein said reference interpolator comprises:

a first register for receiving an incremental reference value;

a second register for receiving an initial reference coordinate value; and an adder circuit coupled to said first and second registers for adding the contents of said first and second registers and providing the sum back into said second register, wherein a portion of said second register provides said reference coordinate for each of the orthogonal row of pixels.

33. The apparatus of claim 30, wherein said orthogonal interpolator comprises:

a first register for receiving said orthogonal coordinate slope value;

a second register for receiving an initial orthogonal value; and an adder circuit coupled to said first and second registers for adding the contents of said first and second registers and providing the sum back into said second register.

34. The apparatus of claim 33, wherein said first and second registers each have fractional and integer portions, wherein said adder circuit comprises:

a first adder for adding said fractional portions of said first and second registers and providing a carry output signal; and a second adder receiving said carry input signal for adding said integer portions of said first and second registers and the value of said carry output signal.

35. The apparatus of claim 34, wherein said overflow circuit compares a sign bit of said integer portion of said first register to said carry output signal, and provides a fractional overflow signal indicative thereof.

36. The apparatus of claim 30, wherein said width interpolator comprises:

a first register for receiving an incremental width value;

a second register for receiving an initial orthogonal width value; and an adder circuit coupled to said first and second registers for adding the contents of said first and second registers and providing the sum back into said second register, wherein a portion of said second register provides said width values for each of the orthogonal row of pixels.

37. The apparatus of claim 30, wherein said characteristic interpolator comprises:

a first register for receiving said main side characteristic slope value;

a second register for receiving said initial characteristic value; and an àdder circuit coupled to said first and second registers for adding the contents of said first and second registers and providing the sum back into said second register, wherein a portion of said second register provides said characteristic values for each initial pixel of the orthogonal rows of pixels.

38. The apparatus of claim 30, wherein said error interpolator comprises:

memory for storing said characteristic error value and said orthogonal characteristic slope value;

a register; and an adder circuit coupled to said memory, said register and said overflow circuit, wherein said adder circuit adds the magnitude of said characteristic error value to the contents of said register for each orthogonal row of pixels while said overflow signal does not indicate fractional overflow, so that said register holds and accumulated error value having a numeric sign opposite the numeric sign of said orthogonal characteristic slope value, and wherein said adder circuit adds said orthogonal characteristic slope value to said accumulated error value when said fractional overflow is indicated.

39. The apparatus of claim 38, wherein said adder circuit comprises:

an arithmetic logic unit having a first data input coupled to the output of said register, a second data input, an output provided to said register and an input for receiving a function select signal, wherein said arithmetic logic unit either adds data provided to said second data input to, or subtracts said data from, said accumulated error value depending upon said function select signal; and a select circuit coupled to said memory, said arithmetic logic unit and said comparator circuit, for providing either said orthogonal characteristic slope value when said fractional overflow is indicated, or else providing said characteristic error value to said second input of said arithmetic logic unit when said fractional overflow is not indicated, and for asserting said function select signal to indicate an add function when said fractional overflow is indicated or if the numeric signs of said orthogonal characteristic slope value and said characteristic error value are opposite, but otherwise providing said function select signal to indicate a subtract function.

40. The apparatus of claim 38, wherein said error interpolator further comprises an adder coupled to an output of said register for adding said accumulated error value to said characteristic values of said initial pixels of each orthogonal row of pixels.

41. The apparatus of claim 30, further comprising a controller receiving said count value and coupled to said reference interpolator, said orthogonal interpolator, said width interpolator, said characteristic interpolator and said error interpolator for asserting signals to control the interpolation process.

42. The apparatus of claim 30, wherein said coplanar polygon includes a first and a second side opposite the main side, further comprising:

wherein said count value includes first and second count values corresponding to the first and second opposite sides, respectively, wherein said first count value represents the number of orthogonal rows of pixels to complete the polygon between the main side and the first opposite side, and wherein said second count value represents the number of orthogonal rows of pixels to complete the polygon between the main side and the second opposite side:

wherein said width interpolator comprises:

a first register for receiving a first incremental width value corresponding to the first side;

a second register for receiving a second incremental width value corresponding to the second side;

a third register for receiving a first and a second initial orthogonal width value;

a select circuit having two inputs coupled to said first and second registers, respectively, and an output, said select circuit further receiving a select signal for selecting between said first and second registers and providing the contents of the selected register to said output depending upon said select signal; and an adder circuit coupled to said select circuit and said third register for adding the contents of said register to the output of said select circuit and providing the sum back into said third register, wherein a portion of said third register provides said width values for each of the orthogonal row of pixels; and a controller receiving said first and second count values and providing said select signal to said width interpolator.

43. The apparatus of claim 30, wherein one characteristic of the polygon is depth.

44. The apparatus of claim 30, wherein one characteristic of the polygon is color intensity.

* * * * *